United States Patent
Murabe et al.

[11] Patent Number: 5,944,427
[45] Date of Patent: Aug. 31, 1999

[54] DYNAMIC PRESSURE GAS BEARING STRUCTURE AND METHOD OF MANUFACTURING THE SAME AS WELL AS METHOD OF USING THE SAME

[75] Inventors: Kaoru Murabe; Hisao Takeuchi; Osamu Komura, all of Itami, Japan

[73] Assignee: Sumitomo Electric Industries, Ltd., Osaka, Japan

[21] Appl. No.: 08/981,455

[22] PCT Filed: Apr. 28, 1997

[86] PCT No.: PCT/JP97/01467

§ 371 Date: Dec. 23, 1997

§ 102(e) Date: Dec. 23, 1997

[87] PCT Pub. No.: WO97/41362

PCT Pub. Date: Nov. 6, 1997

[30] Foreign Application Priority Data

Apr. 30, 1996 [JP] Japan ................................ 8-109048

[51] Int. Cl.[6] .................................................. F16C 32/06
[52] U.S. Cl. .......................................... 384/115; 384/100
[58] Field of Search ................................. 384/100, 114, 384/115, 118

[56] References Cited

U.S. PATENT DOCUMENTS

| | | | |
|---|---|---|---|
| 5,593,230 | 1/1997 | Tempest et al. | 384/100 |
| 5,628,567 | 5/1997 | Murabe et al. | 384/100 |
| 5,746,515 | 5/1998 | Takahashi et al. | 384/115 |

FOREIGN PATENT DOCUMENTS

| | | |
|---|---|---|
| 7-75284 | 3/1975 | Japan . |
| 58-224324 | 12/1983 | Japan . |
| 61-201916 | 9/1986 | Japan . |
| 1-7849 | 3/1989 | Japan . |
| 2-89807 | 3/1990 | Japan . |
| 3-204411 | 9/1991 | Japan . |
| 7-230056 | 8/1995 | Japan . |

*Primary Examiner*—Thomas R. Hannon
*Attorney, Agent, or Firm*—W. F. Fasse; W. G. Fasse

[57] ABSTRACT

A cross-sectional shape of a shaft body 1 perpendicular to its axis O has a shape defined by a closed curve having a plurality of maximal points $M_1$, $M_2$ and $M_3$ whose distances from the axis are maximized about the axis O and a plurality of minimal points $N_1$, $N_2$ and $N_3$ whose distances from the axis are minimized. This cross-sectional shape has a groove forming region provided with one groove $1b_1$ at least between the maximal points $M_1$ and $M_2$. When a bearing body 2 rotates on a CCW side with respect to the shaft body 1, the groove $1b_1$ is so arranged that an outer peripheral length $a_1$ in the forward rotational direction exceeds an outer peripheral length $b_1$ in the reverse rotational direction. Thus, a dynamic pressure gas bearing structure which can prevent galling of the shaft body and the bearing body by shifting the shaft body and the bearing body to a noncontact state at a low rotational frequency is obtained

13 Claims, 9 Drawing Sheets

ROTATIONAL DIRECTION OF
HOLLOW CYLINDER

ROTATIONAL DIRECTION OF HOLLOW CYLINDER

ROTATIONAL DIRECTION OF
HOLLOW CYLINDER

ROTATIONAL DIRECTION OF HOLLOW CYLINDER

DYNAMIC PRESSURE GAS BEARING STRUCTURE AND METHOD OF MANUFACTURING THE SAME AS WELL AS METHOD OF USING THE SAME

TECHNICAL FIELD

The present invention relates to a dynamic pressure gas bearing structure and a method of manufacturing the same as well as a method of using the same.

BACKGROUND TECHNIQUE

Following increase of a storage capacity and reduction of an access time of a rotation driving part of a magnetic recording apparatus, such as a hard disk driver (hereinafter referred to as "HDD"), for example, a high rotational speed and high rotational accuracy corresponding thereto are increasingly required to a driving spindle motor of the HDD in recent years. In order to rotate a precision motor to which such a high rotational speed and high rotational accuracy are required, employment of a gas bearing (dynamic pressure gas bearing) for the rotation driving part is proposed.

When a rotator rotates in the rotation driving part employing this dynamic pressure gas bearing, air is forcibly introduced at least into a clearance between a radial gas bearing body and the rotator. Hence, the air pressure in the clearance is increased, and the rotator rotates at a high speed through the dynamic pressure gas bearing. Thus, maintenance of the rotational accuracy is expected also during high-speed rotation, due to the employment of the dynamic pressure gas bearing.

In the aforementioned radial gas bearing, a wedge-shaped clearance is formed by eccentricity of a shaft body in the bearing body, as described in "Gas Bearing" by Shinichi Togo, Kyoritsu Shuppan (1989). Pressure is generated since air is compressed when the air passes through this wedge-shaped clearance. Thus, it is possible to support the shaft body and the bearing body in a noncontact manner.

A concrete structure of such a dynamic pressure gas bearing is described in Japanese Patent Publication No. 4-21844, for example. The structure described in this gazette is now described as a conventional dynamic pressure gas bearing structure.

FIG. 18 is a sectional view of a principal part of the conventional dynamic pressure gas bearing structure. Referring to FIG. 18, a shaft body 31 is arranged in a hollow cylinder of a bearing body 32. A sectional shape of this shaft body 31 in the radial direction has such a shape that a plurality of grooves 31*b* in the form of substantially L-shaped notches are equally distributed and provided on the outer periphery of a circular cylinder 31*a* having a section of a substantially complete round.

In this conventional dynamic pressure gas bearing structure, the shaft body 31 is so structured as to rotate with respect to the bearing body 32. When the shaft body 31 rotates, air is caught in the grooves 31*b* provided on the outer periphery of the shaft body 31, and dynamic pressure is generated by combination of vortex motion of the caught air and wedge action with respect to the inner peripheral surface of the bearing body 32. Due to this dynamic pressure, it comes to that the shaft body 31 and the bearing body 32 are supported in the radial direction in a noncontact manner in the rotational operation thereof.

In the conventional dynamic pressure gas bearing shown in FIG. 18, however, dynamic pressure cannot be efficiently generated between the shaft body 31 and the bearing body 32 in a low rotational speed area after rotating/starting the shaft body 31. Therefore, the shaft body 31 and the bearing body 32 cannot be shifted from a contact state to a noncontact state at a low rotational frequency. Thus, there has been such a problem that abrasion powder results from continuous contact between the shaft body 31 and the bearing body 32 up to a high rotational frequency shifting the same to the noncontact state, and galling is caused between the shaft body 31 and the bearing body 32 by the abrasion powder.

DISCLOSURE OF THE INVENTION

The present invention is to provide a dynamic pressure gas bearing structure which can prevent galling of a shaft body and a bearing body by shifting the shaft body and the bearing body to a noncontact state at a low rotational frequency and a method of manufacturing the same as well as a method of using the same.

A dynamic pressure gas bearing structure according to one aspect of the present invention comprises a circular cylindrical shaft body and a hollow cylindrical bearing body opposed to the shaft body with a clearance in the radial direction. A cross-sectional shape of the shaft body perpendicular to its axis has a shape which is defined by a closed curve having a plurality of maximal points whose distances from the axis are maximized about the axis and a plurality of minimal points whose distances from the axis are minimized, and has a groove forming region provided with at least one groove between at least adjacent first and second maximal points among the plurality of maximal points. Assuming that A represents the distance from an end portion of the groove closest to the first maximal point in the groove forming region to the first maximal point along the closed curve and B represents the distance from an end portion of the groove closest to the second maximal point in the groove forming region to the second maximal point, $A \geq B$ is satisfied.

In the dynamic pressure gas bearing structure according to one aspect of the present invention, the cross-sectional shape of the shaft body perpendicular to its axis has plural maximal points and minimal points and the groove is formed on its outer periphery, whereby the space between the shaft body and the bearing body changes along the circumferential direction. Namely the space between the shaft body and the bearing body becomes relatively narrow in the portions of the maximal points and relatively wide in the portions of the minimal points, and becomes wider in the region provided with the groove.

The region provided with the groove has no dynamic pressure effect, but becomes a pressure state close to the atmospheric pressure. The dynamic pressure gas bearing starts rotating from a speed 0, and the centers of the shaft body and the bearing body are remarkably decentered until the shaft body and the bearing body shift from a contact state to a noncontact state. A taper consisting of the circumference between a maximal point present on a cross section of the shaft body and an edge of the groove forms such a region that its clearance is gradually reduced between the same and the inner surface of the bearing body with respect to the eccentric direction. If the length A of the taper is sufficient with respect to an air flow direction in the bearing clearance, the pressure in the clearance is increased by an effect of the wedge-shaped clearance, and the bearing body can be supported in a noncontact state with respect to the shaft body even at a relatively low speed.

On the other hand, there has been such a problem that the effect of the wedge-shaped clearance cannot be sufficiently attained at a low speed and the bodies do not shift to the noncontact state unless a high speed is attained if the shaft body is an incomplete round and the taper with respect to the rotational direction is shortened due to provision of the groove.

According to the present invention, a dynamic pressure effect by the wedge-shaped clearance can be efficiently caused by relatively increasing the length A of the taper with respect to the rotational direction. Therefore, it is possible to float the bearing body with respect to the shaft body at a low rotational frequency, for bringing the same into the noncontact state.

Thus, it is possible to suppress generation of abrasion powder caused by direct contact of the shaft body and the bearing body at a high speed in a rotation start time and a stop time. Due to this, a failure caused by galling of the shaft body and the bearing body can be suppressed, and it is possible to use the structure in clean environment not contaminating the surroundings since occurrence of dust is small.

The dynamic pressure gas bearing structure according to the aforementioned one aspect can attain the intended object by being so used as to feed the air in the clearance which is defined when the shaft body and the hollow cylindrical bearing body are oppositely arranged from the first maximal point to the second maximal point through the groove forming region in relation to relative rotational motion of the shaft body and the bearing body.

A dynamic pressure gas bearing structure according to another aspect of the present invention comprises a circular cylindrical shaft body and a hollow cylindrical bearing body opposed to the shaft body with a clearance in the radial direction. A cross-sectional shape of the shaft body perpendicular to its axis has a shape defined by a closed curve having a plurality of maximal points whose distances from the axis are maximized about the axis and a plurality of minimal points whose distances from the axis are minimized. Grooves are arranged on the outer periphery of the shape defined by this closed curve in portions to become the maximal points.

Also in the dynamic pressure gas bearing structure according to another aspect of the present invention, it is possible to efficiently cause a dynamic pressure effect by a wedge-shaped clearance by bringing the outer peripheral shape of the shaft body into an incomplete round and providing the grooves on the outer periphery similarly to the dynamic pressure gas bearing structure according to the aforementioned one aspect. Therefore, it is possible to float the bearing body with respect to the shaft body at a low rotational frequency, for bringing the same into a noncontact state.

Thus, it is possible to suppress generation of abrasion powder caused by direct contact between the shaft body and the bearing body at a high speed in a rotation start time and a stop time. Due to this, a failure caused by galling of the shaft body and the bearing body can be suppressed, and it is possible to use the structure in clean environment not contaminating the surroundings since occurrence of dust is small.

The dynamic pressure gas bearing structure according to the aforementioned another object can attain the intended object by being so used as to feed air in a clearance which is defined when the shaft body and the hollow cylindrical bearing body are oppositely arranged from a first maximal point to a second maximal point through the grooves in relation to relative rotational motion of the shaft body and the bearing body.

A dynamic pressure gas bearing structure according to still another object of the present invention comprises a circular cylindrical shaft body and a hollow cylindrical bearing body opposed to the shaft body with a clearance in the radial direction. In a cross section of the shaft body perpendicular to its axis, a groove of at least one portion is formed on the outer periphery of the shaft body. Assuming that $E_1$ represents a boundary point between one end of the groove and the outer periphery of the shaft body, $E_2$ represents a boundary point between another end of the groove and the outer periphery of the shaft body, and a central point O represents a point where the axis is positioned on the cross section, the number of such grooves that respective position vectors $\vec{r}_1$ and $\vec{r}_2$ from the central point O to the boundary points $E_1$ and $E_2$ satisfy the relation:

$$|\vec{r}_2| = k \times |\vec{r}_1| \quad (k>1)$$

is at least the majority with respect to the total number of the grooves.

In the dynamic pressure gas bearing structure according to still another aspect of the present invention, the position vectors $\vec{r}_1$ and $\vec{r}_2$ from the center of the shaft body to the end portions of the groove are brought into the relation:

$$|\vec{r}_2| = k \times |\vec{r}_1| \quad (k>1)$$

and the clearance between the shaft body and the bearing body is changed along the groove, whereby a dynamic pressure effect can be effectively caused, and it is possible to float the bearing body with respect to the shaft body at a low rotational frequency for bringing the same into a noncontact state.

Thus, it is possible to suppress generation of abrasion powder caused by direct contact between the shaft body and the bearing body at a high speed in a rotation start time and a stop time. Due to this, a failure caused by galling of the shaft body and the bearing body can be suppressed, and it is possible to use the structure in clean environment not contaminating the surroundings since occurrence of dust is small.

The dynamic pressure gas bearing structure according to the aforementioned still another aspect can attain the intended object by being so used as to feed air in the clearance which is defined when the shaft body and the hollow cylindrical bearing body are oppositely arranged from the boundary point $E_1$ side to the boundary point $E_2$ side through the groove(s) in relation to relative rotational motion of the shaft body and the bearing body.

It is also possible to form a magnetic circuit and a control circuit of a motor into which the dynamic pressure gas bearing structures according to the aforementioned three aspects used in this manner are assembled.

The dynamic pressure effect in the portion of the groove can be attained by changing angles of first and second side walls with respect to a bottom wall, i.e., by rendering the angle of the taper forming the groove asymmetric, whereby dynamic pressure opposable to the dynamic pressure effect by the aforementioned taper on the outer periphery can be obtained. Even if the aforementioned relation does not hold in the taper on the outer periphery, therefore, it is possible to float the bearing body with respect to the shaft body at a low rotational frequency, for bringing the same into the noncontact state.

A method of manufacturing a dynamic pressure gas bearing structure according to one aspect of the present invention is a method of manufacturing a dynamic pressure gas bearing structure comprising a circular cylindrical shaft body and a hollow cylindrical bearing body opposed to the shaft body with a clearance in the radial direction, and comprises the following steps:

First, formed is a shaft body having an axis and having a cross-sectional shape perpendicular to the axis which is defined by a closed curve having a plurality of maximal points whose distances from the axis are maximized about the axis and a plurality of minimal points whose distances from the axis are minimized so that the cross-sectional shape perpendicular to the axis becomes a shape defined by δ and C assuming that all points on the closed curve are between two virtual concentric circles, δ represents the radial space between the two virtual concentric circles in such case that the difference of the radial space between the two virtual concentric circles is minimized and C represents the mean value of the diameters of the two virtual concentric circles. Then, a groove forming region having at least one groove is formed on the outer periphery of the shaft body at least between adjacent first and second maximal points among the plurality of maximal points. When the bearing body relatively rotates about the axis in one rotational direction side with respect to the shaft body, the first maximal point is positioned on one rotational direction side of the groove forming region, and the second maximal point is positioned on another rotational direction side of the groove forming region reverse to the one rotational direction. Assuming that A represents the distance from an end portion of the groove closest to the first maximal point in the groove forming region to the first maximal point along the closed curve and B represents the distance from an end portion of the groove closest to the second maximal point in the groove forming region to the second maximal point along the closed curve, the shaft body is so formed as to satisfy $A \geq B$.

A method of manufacturing a dynamic pressure gas bearing structure according to another aspect of the present invention is a method of manufacturing a dynamic pressure gas bearing structure comprising a circular cylindrical shaft body and a hollow cylindrical bearing body opposed to the shaft body with a clearance in the radial direction, and comprises the following steps:

First, formed is a shaft body having a cross-sectional shape perpendicular to its axis which is defined by a closed curve having a plurality of maximal points whose distances from the axis are maximized about the axis and a plurality of minimal points whose distances from the axis are minimized so that the cross-sectional shape perpendicular to the axis becomes a shape defined by δ and C assuming that all points on the closed curve are between two virtual concentric circles, δ represents the radial space between the two virtual concentric circles in such case that the difference of the radial space between the two virtual concentric circles is minimized and C represents the mean value of the diameters of the two virtual concentric circles. A groove is formed on the position of at least one maximal point of the shaft body.

According to the methods of manufacturing dynamic pressure gas bearing structures according to the aforementioned two aspects, it is possible to obtain dynamic pressure gas bearing structures which can generate dynamic pressure by effects of wedge-shaped clearances, and can suppress occurrence of galling of the shaft bodies and the bearing bodies.

BEST MODE FOR CARRYING OUT THE INVENTION

Figure 1:
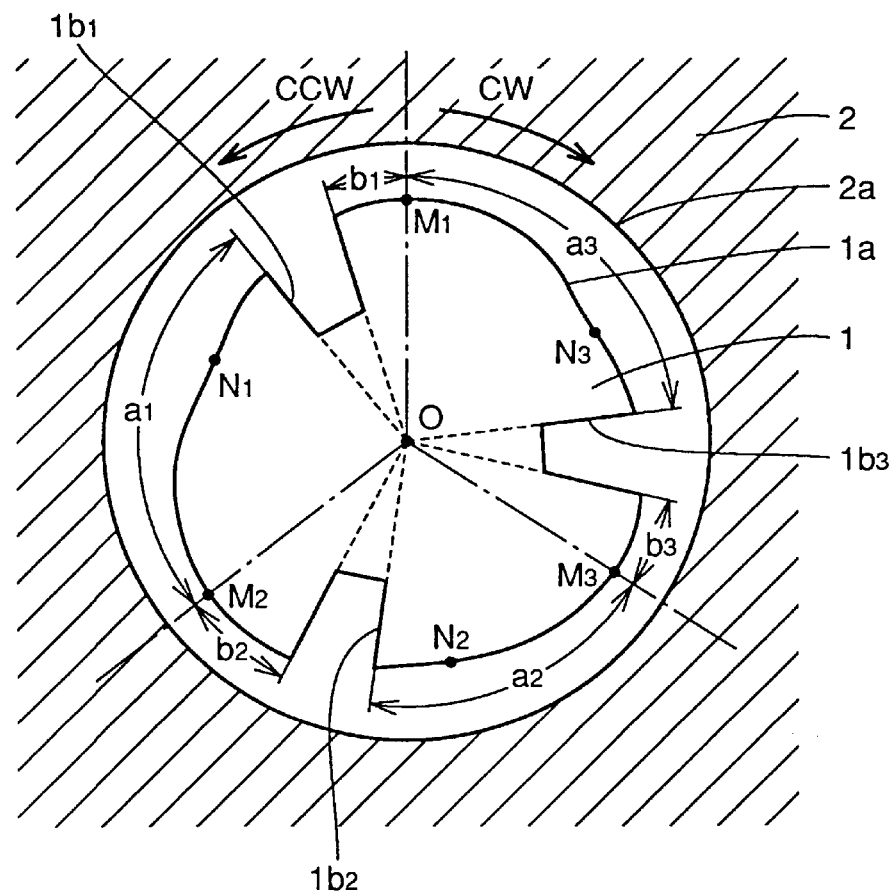
FIG. 1 is a sectional view of a principal part showing a dynamic pressure gas bearing structure of the present invention in a radial section of a shaft body.
Figure 2:
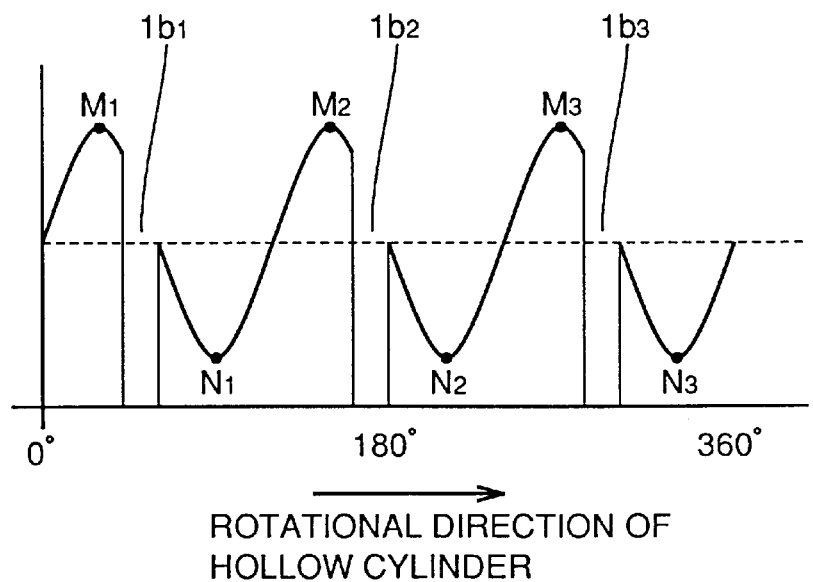
FIG. 2 is a diagram showing displacement of outer peripheral positions with respect to rotation angles at a time of rotating the shaft body about an axis in the dynamic pressure gas bearing structure shown in FIG. 1.

FIG. 1 is a sectional view of a principal part of a dynamic pressure gas bearing structure in one embodiment of the present invention. FIG. 2 is a diagram showing displacement of outer peripheral positions with respect to rotation angles at a time of rotating a shaft body about an axis in the bearing structure of FIG. 1.

Referring to FIG. 1 and FIG. 2, the dynamic pressure gas bearing structure of this embodiment comprises a shaft body 1, and a hollow cylindrical bearing body 2 which is opposed to the shaft body 1 with a clearance in the radial direction. A radial sectional shape (i.e., a cross-sectional shape perpendicular to an axis O) of the shaft body 1 has a shape 1a defined by a closed curve having a plurality of maximal points $M_1$, $M_2$ and $M_3$ whose distances from this axis O are maximized about the axis O and a plurality of minimal points $N_1$, $N_2$ and $N_3$ whose distances from the axis O are minimized. At least one groove $1b_1$ is formed at least between adjacent maximal points $M_1$ and $M_2$.

Only one groove $1b_1$ is formed between the adjacent maximal points $M_1$ and $M_2$ here, and hence only a region provided with this groove $1b_1$ becomes a groove forming region.

The bearing body 2 is so supported as to relatively rotate about the axis O in the anticlockwise direction (CCW direction) side in the figure with respect to the shaft body 1. Assuming that $a_1$ represents the outer peripheral length from an end portion of the groove $1b_1$ on the maximal point $M_1$ side to the maximal point $M_1$ and $b_1$ represents the outer peripheral length from an end portion of the groove $1b_1$ on the maximal point $M_1$ side to the maximal point $M_1$ at this time, the relation of $a_1 \geq b_1$ is satisfied. Namely, the outer peripheral length $a_1$ of the groove $1b_1$ in the forward rotational direction has a dimension exceeding the outer peripheral length $b_1$ in the reverse rotational direction.

Due to such possession of the maximal points, the minimal points and the groove, the structure has a taper which is relatively long in the rotational direction with respect to the minimum clearance when the bearing body 2 is eccentric with respect to the shaft body 1. When air flows in a clearance defined between the shaft body 1 and the bearing body 2, therefore, dynamic pressure is efficiently generated by the taper which is relatively long with respect to the rotational direction. Thus, the shaft body 1 can be floated with respect to the bearing body 2 at a low rotational frequency. Therefore, galling of the shaft body 1 and the bearing body 2 resulting from abrasion powder caused by contact between the shaft body 1 and the bearing body 2 in a rotation start time and a stop time, for example, is suppressed.

Respective grooves $1b_1$, $1b_2$ and $1b_3$ may be so arranged that the sum $\Sigma a$ $(=a_1+a_2+a_3)$ of the outer peripheral lengths in the forward rotational direction exceeds the sum $\Sigma b$ $(=b_1+b_2+b_3)$ of the outer peripheral lengths in the reverse rotational direction.

So far as this relation is satisfied, the outer peripheral length $a_2$ of the groove $1b_2$ in the forward rotational direction may be smaller than the outer peripheral length $b_2$ in the reverse rotational direction. Similarly, the outer peripheral length $a_3$ of the groove $1b_3$ in the forward rotational direction may be smaller than the outer peripheral length $b_3$ in the reverse rotational direction.

Figure 3:
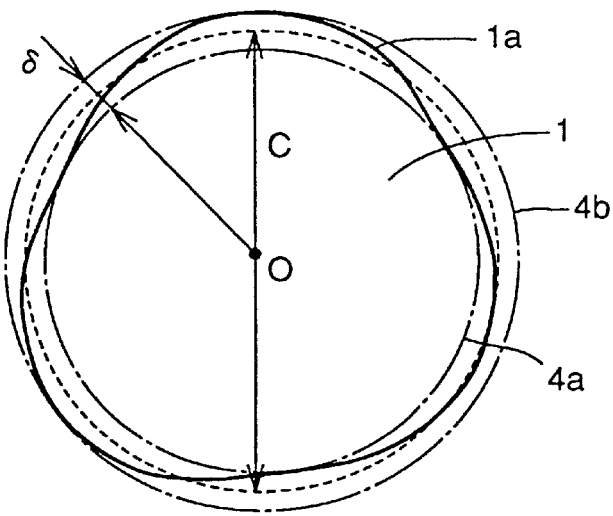
FIG. 3 is a diagram for illustrating δ and C.

A cross section of the shaft body 1 perpendicular to the axis O before formation of the grooves $1b_1$, $1b_2$ and $1b_3$ becomes that shown in FIG. 3.

Referring to FIG. 3, the cross-sectional shape of this shaft body 1 is defined by δ and C. δ represents the radial space between two virtual concentric circles 4a and 4b in such case that all points on the closed curve 1a defining the outline of the shaft body 1 before groove formation are between the two virtual concentric circles 4a and 4b and the difference of the radial space between the two virtual concentric circles 4a and 4b is minimized. C represents the mean value of the diameters of the two virtual concentric circles 4a and 4b.

Figure 4:
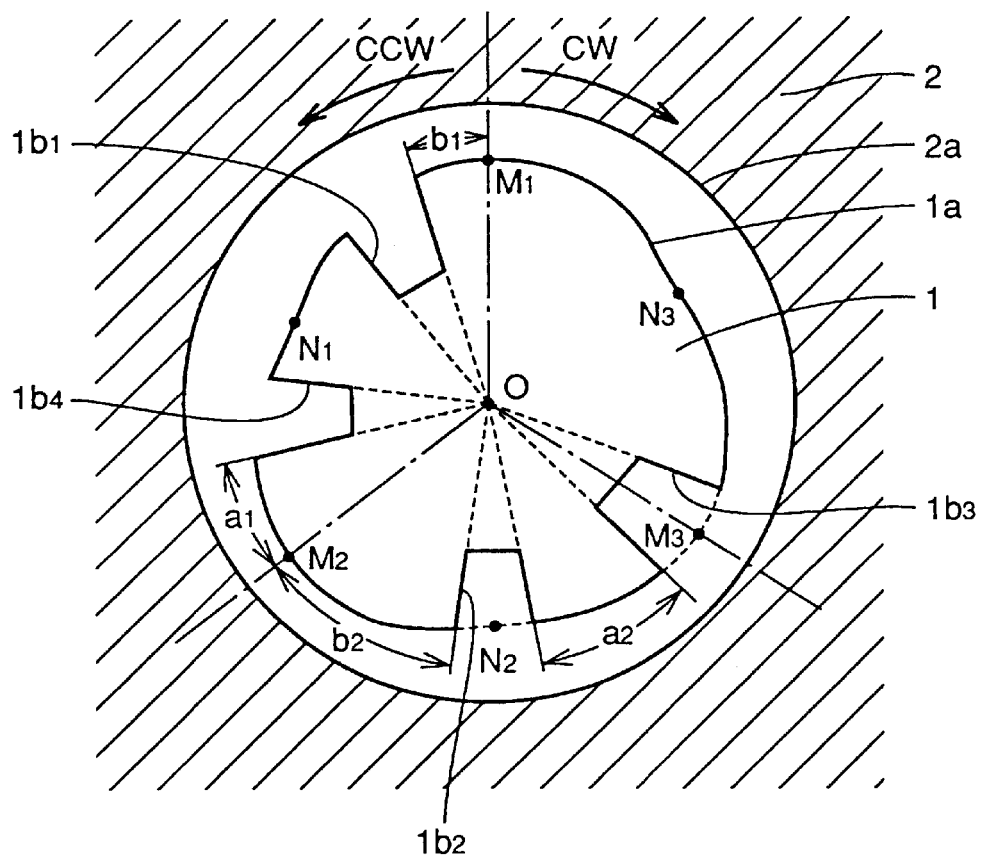
FIG. 4 is a sectional view of a principal part showing such a structure that at least two grooves are provided between adjacent maximal points in the dynamic pressure gas bearing structure of the present invention.
Figure 5:
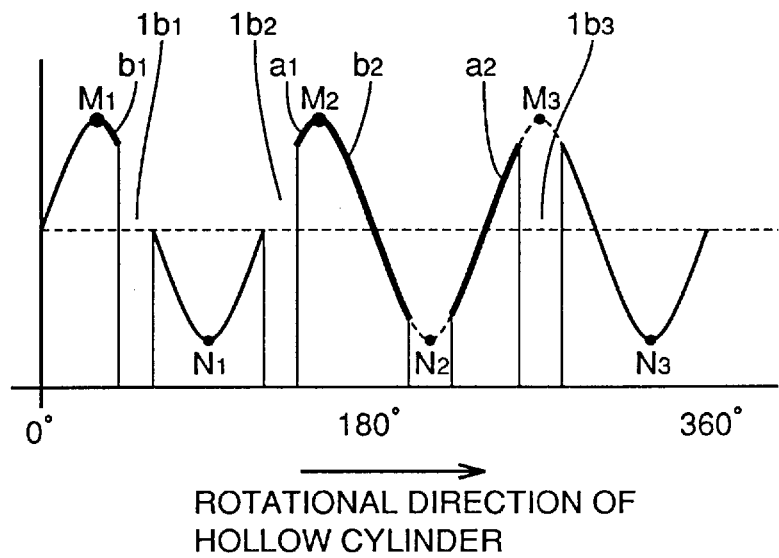
FIG. 5 is a diagram showing displacement of outer peripheral positions with respect to rotation angles at a time of rotating a shaft body about an axis in the dynamic pressure gas bearing structure shown in FIG. 4.

When a plurality of grooves $1b_1$ and $1b_4$ are provided between adjacent maximal points $M_1$ and $M_2$ as shown in FIG. 4 and FIG. 5, the outer peripheral lengths in the forward rotational direction and the reverse rotational direction are defined as follows.

Referring to FIG. 4 and FIG. 5, the outer peripheral length in the forward rotational direction becomes the distance $a_1$ from an end portion of the groove $1b_4$ closest to the maximal point $M_2$ to the maximal point $M_2$ along the outer periphery. The outer peripheral length in the reverse rotational direction becomes the distance $b_1$ from an end portion of the groove $1b_1$ closest to the maximal point $M_1$ to the maximal point $M_1$ along the outer periphery.

When the groove $1b_3$ is provided in a portion forming the maximal point $M_3$ and the groove $1b_2$ is provided between this groove $1b_3$ and the maximal point $M_2$, the outer peripheral length becomes the distance $a_2$ from an end portion of the groove $1b_2$ on the groove $1b_3$ side to an end portion of the groove $1b_3$ on the groove $1b_2$ side along the outer periphery, and the outer peripheral length in the reverse rotational direction becomes the distance $b_2$ from an end portion of the groove $1b_2$ on the maximal point $M_2$ side to the maximal point $M_2$ along the outer periphery.

Figure 6:
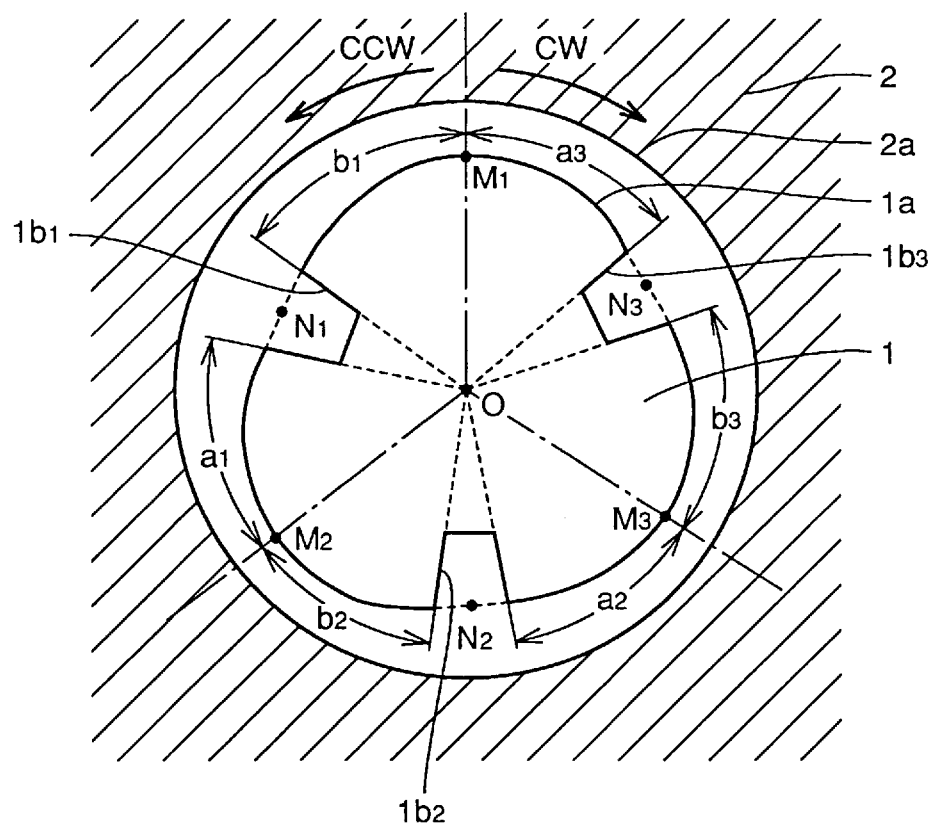
FIG. 6 is a sectional view of a principal part showing a structure in such case that grooves are provided on positions to become minimal points in the dynamic pressure gas bearing structure of the present invention.
Figure 7:
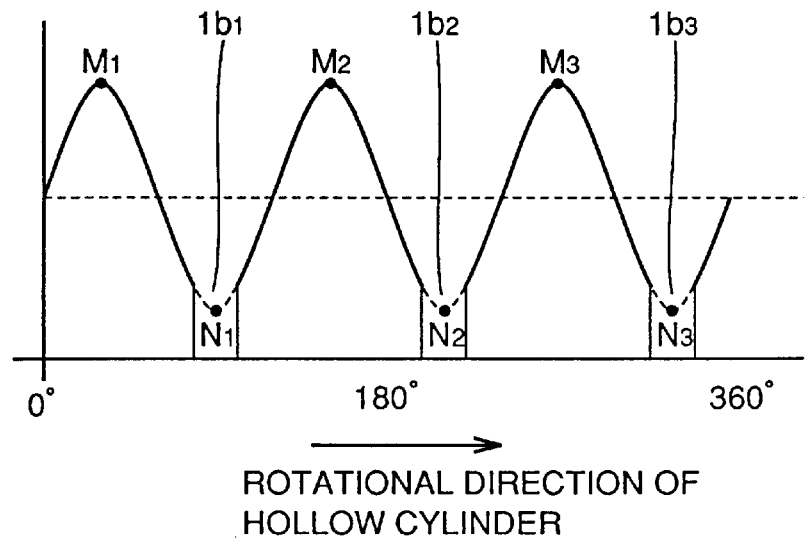
FIG. 7 is a diagram showing displacement of outer peripheral positions with respect to rotation angles at a time of rotating a shaft body about an axis in the dynamic pressure gas bearing structure shown in FIG. 6.

When the grooves $1b_1$, $1b_2$ and $1b_3$ are present in portions forming the minimal points $N_1$, $N_2$ and $N_3$ as shown in FIGS. 6 and 7, the outer peripheral length in the forward rotational direction becomes the distance $a_1$ from an end portion of the groove $1b_1$ on the maximal point $M_2$ side to the maximal point $M_2$, for example, and the outer peripheral length in the reverse rotational direction becomes the distance $b_1$ from an end portion of the groove $1b_1$ on the maximal point $M_1$ side to the maximal point $M_1$ along the outer periphery, for example.

Figure 8:
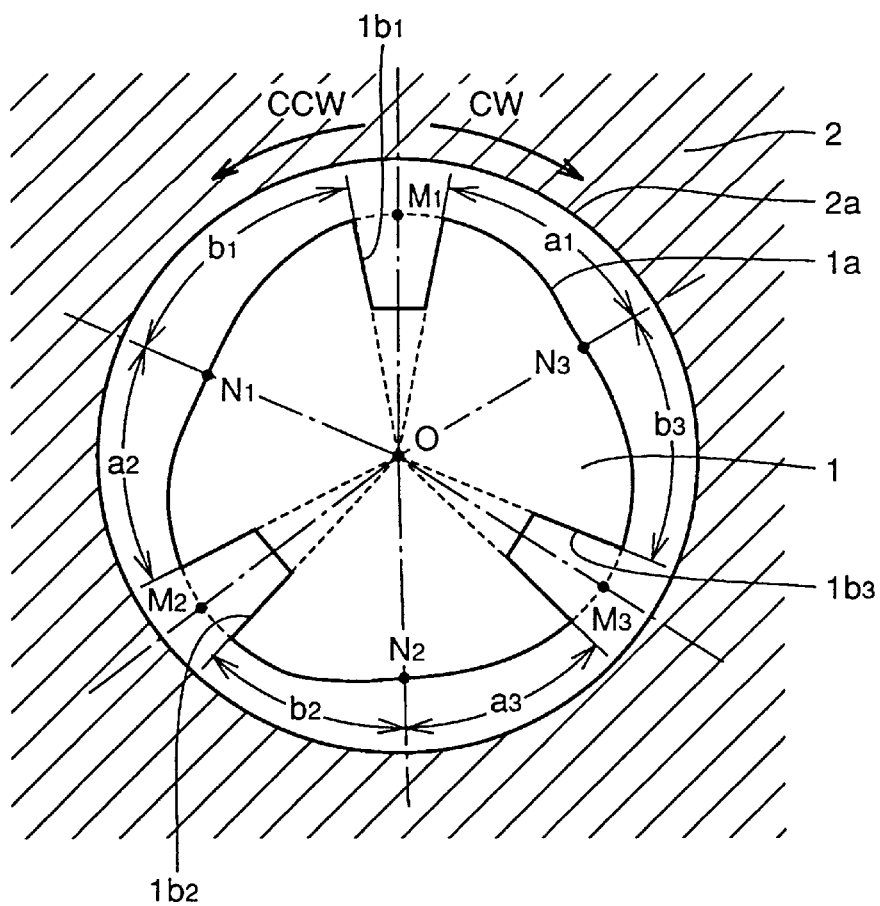
FIG. 8 is a sectional view of a principal part showing a structure in such case that grooves are provided on positions to become maximal points in the dynamic pressure gas bearing structure of the present invention.
Figure 9:
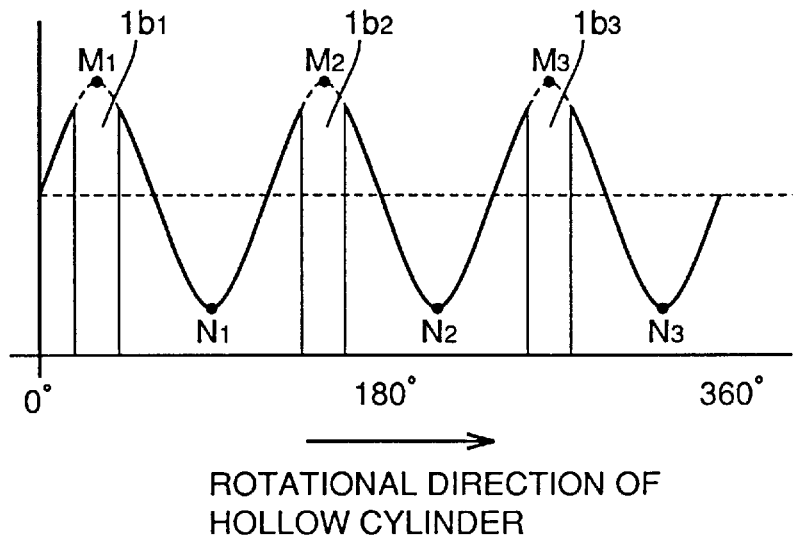
FIG. 9 is a diagram showing displacement of outer peripheral positions with respect to rotation angles at a time of rotating a shaft body about an axis in the dynamic pressure gas bearing structure shown in FIG. 8.

When the grooves $1b_1$, $1b_2$ and $1b_3$ are present in portions forming the maximal points $M_1$, $M_2$ and $M_3$ as shown in FIGS. 8 and 9, the outer peripheral length in the forward rotational direction becomes the distance $a_1$ from an end portion of the groove $1b_1$ on the minimal point $N_3$ side to the minimal point $N_3$ along the outer periphery, for example, and the outer peripheral length in the reverse rotational direction becomes the distance $b_1$ from an end portion of the groove $1b_1$ on the minimal point $N_1$ side to the minimal point $N_1$ along the outer periphery, for example.

The aforementioned maximal points and minimal points may be maximal points and minimal points derived from the outer peripheral shape (FIGS. 4, 6 and 8) of the shaft body 1 after groove part formation by a curve interpolation method such as a least squares method or a spline method, for example.

When the grooves $1b_1$, $1b_2$ and $1b_3$ are provided on the portions to become the minimal points $N_1$, $N_2$ and $N_3$ respectively as shown in FIG. 6 and FIG. 7, it is preferable that the relation between the sum of the outer peripheral lengths in the forward rotational direction and the sum of the outer peripheral lengths in the reverse rotational direction is:

$$a_1+a_2+a_3 \geq b_1+b_2+b_3$$

It is possible to float the bearing body 2 with respect to the shaft body 1 at a low rotational frequency by providing the grooves $1b_1$, $1b_2$ and $1b_3$ in the portions to become the maximal points $M_1$, $M_2$ and $M_3$ as shown in FIG. 8 and FIG. 9. In this case, it is preferable that the relation between the sum of the outer peripheral lengths in the forward rotational direction and the sum of the outer peripheral lengths in the reverse rotational direction is:

$$a_1+a_2+a_3 \geq b_1+b_2+b_3$$

Figure 10:
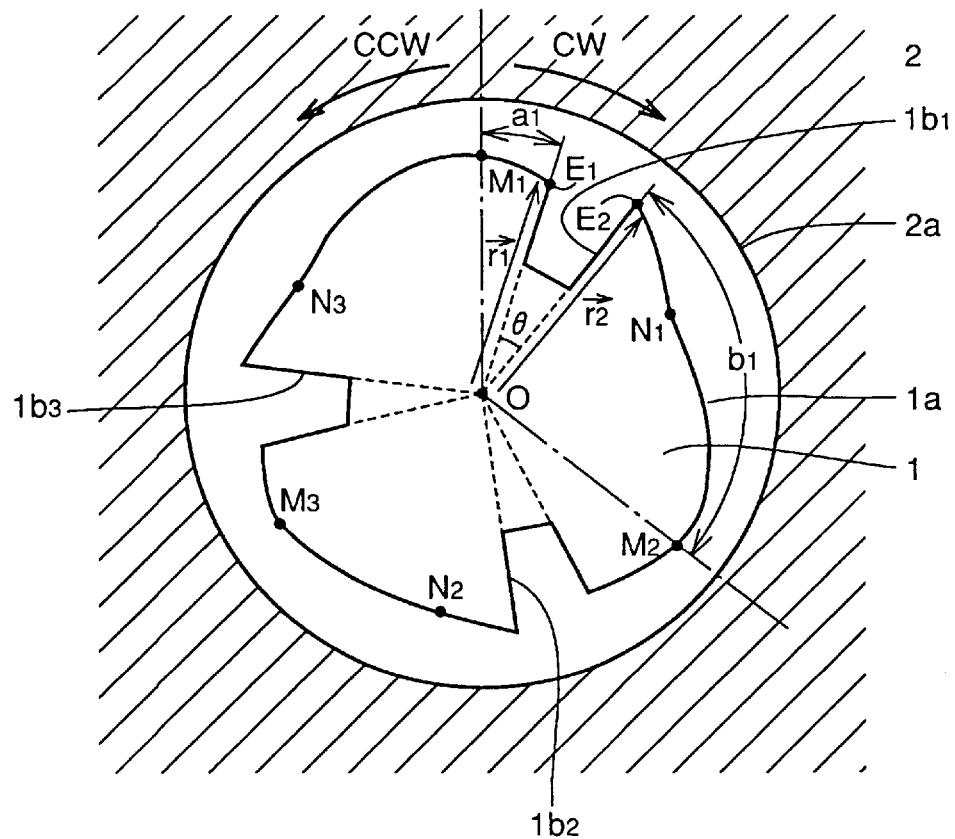
FIG. 10 is a sectional view of a principal part showing a structure having groove shapes defined by prescribed position vectors in the dynamic pressure gas bearing structure of the present invention.

FIG. 10 is a sectional view of a principal part of a dynamic pressure gas bearing structure in another embodiment of the present invention. Referring to FIG. 10, the dynamic pressure gas bearing structure of this embodiment comprises a shaft body 1 and a hollow cylindrical bearing body 2 opposed to the shaft body 1 with a clearance in the radial direction, similarly to the aforementioned one embodiment. Grooves $1b_1$, $1b_2$ and $1b_3$ are formed at least in one portion, e.g., in three portions on the outer periphery of the shaft body 1 in a radial section of the shaft body 1.

Particularly with reference to the groove $1b_1$, the number of such grooves that a position vector $\vec{r}_1$ from a central point O to a boundary point $E_1$ (boundary point between one end of the groove $1b_1$ and the outer periphery of the shaft body 1) and a position vector $\vec{r}_2$ from the central point O to a boundary point $E_2$ (boundary point between another end of the groove $1b_1$ and the outer periphery of the shaft body 1) satisfy the following relation is at least the majority of the total number of the grooves assuming that the central point O represents a point where the axis is positioned in the cross section:

$$|\vec{r}_2|=k|\vec{r}_1| \quad (k>1)$$

Namely, when having three grooves as shown in the figure, for example, the number of such grooves that the position vector $\vec{r}_1$ is larger than the position vector $\vec{r}_2$ is at least two.

Figure 11:
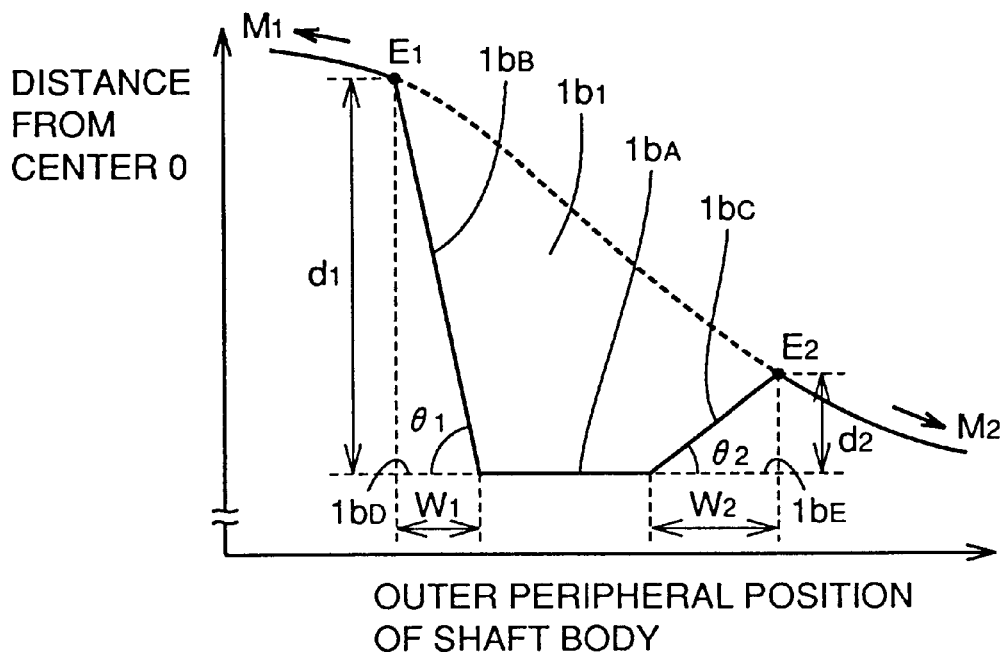
FIG. 11 is a diagram for a shaft body for defining shapes of grooves having taper shapes in the dynamic pressure gas bearing structure of the present invention.

The shape of each groove shown in FIG. 10 may be in a shape shown in FIG. 11.

With reference to FIGS. 10 and 11, description is now made with reference to the groove $1b_1$.

This groove $1b_1$ is formed between the maximal points $M_1$ and $M_2$, and the bearing body 2 is so supported as to rotate about the axis O in the anticlockwise direction (CCW direction: i.e., the direction of (position vector $\vec{r}_1$)–(position vector $\vec{r}_2$)) relatively with respect to the shaft body 1. Assuming that $a_1$ represents the outer peripheral length from an end portion (boundary point $E_1$) of the groove $1b_1$ on the maximal point $M_1$ side to the maximal point $M_1$ and $b_1$ represents the outer peripheral length from an end portion (boundary point $E_2$) of the groove $1b_1$ on the maximal point $M_2$ side to the maximal point $M_2$, $a_1<b_1$ is satisfied at this time. Namely, the outer peripheral length $a_1$ of the groove $1b_1$ in the forward rotational direction has a dimension less than the outer peripheral length $b_2$ in the reverse rotational direction. When the shapes of the respective grooves $1b_1$, $1b_2$ and $1b_3$ satisfy the aforementioned relation, the relation between the sum $\Sigma a$ of the outer peripheral lengths in the forward rotational direction and the sum $\Sigma b$ of the outer peripheral lengths in the reverse rotational direction may be arbitrary relation.

The shape of the groove $1b_1$ is defined by a bottom wall $1b_A$ and first and second side walls $1b_B$ and $1b_C$. The first side wall $1b_B$ reaches the boundary point $E_1$ from one end of the bottom wall $1b_A$, and the second side wall $1b_C$ reaches the boundary point $E_2$ from another end of the bottom wall $1b_A$. This groove $1b_1$ has such a taper shape that the distance (i.e., opening dimension) between the first and second side walls $1b_B$ and $1b_C$ reduces toward the bottom wall $1b_A$ from the outer peripheral side of the shaft body 1.

The relation between an angle (taper angle) $\theta_1$ formed by a virtual plane $1b_D$ extending from one end of the bottom wall $1b_A$ along the bottom wall $1b_A$ and the first side wall $1b_B$ and an angle (taper angle) $\theta_2$ formed by a virtual plane $1b_E$ extending from another end of the bottom wall $1b_A$ along the bottom wall $1b_A$ and the second side wall $1b_C$ is:

$$\theta_1 > \theta_2$$

where $\theta_1 = \tan^{-1}(d/w_1)$ $\theta_2 = \tan^{-1}(d/w_2)$ $d=(d_1+d_2)/2$ In case of tapers relatively short with respect to the rotational direction as hereinabove described in relation to the structure having the relation between the maximal points, the minimal points and the grooves in this manner, dynamic pressure cannot be efficiently generated from a low rotational frequency even if air flows in the clearance formed between the shaft body 1 and the bearing body 2, and there is the possibility of causing abrasion powder due to contact between the shaft body 1 and the bearing body 2 in a rotation start time and a stop time, for example.

Due to formation of the groove $1b_1$ having the taper shape in the aforementioned mode, a portion of the groove $1b_1$ having a large taper angle effectively supplies air into the bearing clearance due to communication with the exterior of the bearing, and a portion having a small taper angle generates dynamic pressure by an effect of a wedge-shaped clearance with air supplied from the exterior by the taper.

It is conceivable that, when the tapers on both sides of the groove $1b_1$ are equal to each other, differentiation of the function of the aforementioned groove is not sufficiently performed, and does not effectively act with occurrence of turbulence in flow of air communicating with the outside air and flow of air caused by dynamic pressure generation in the groove.

When the relation between the taper angles is reverse, no dynamic pressure is generated in the groove part since the direction where the wedge-shaped clearance in the groove narrows and the direction where the air flows become reverse, and it comes to that the aforementioned problem of not floating at a low rotational frequency arises since generation of dynamic pressure is more dominant in the taper portion on the outer periphery than the groove part.

If the shapes of the respective grooves $1b_1$, $1b_2$ and $1b_3$ satisfy the aforementioned relation, the relation between the sum $\Sigma a$ of the outer peripheral lengths in the forward rotational direction and the sum $\Sigma b$ of the outer peripheral lengths in the reverse rotational direction may be arbitrary direction.

Figure 12:
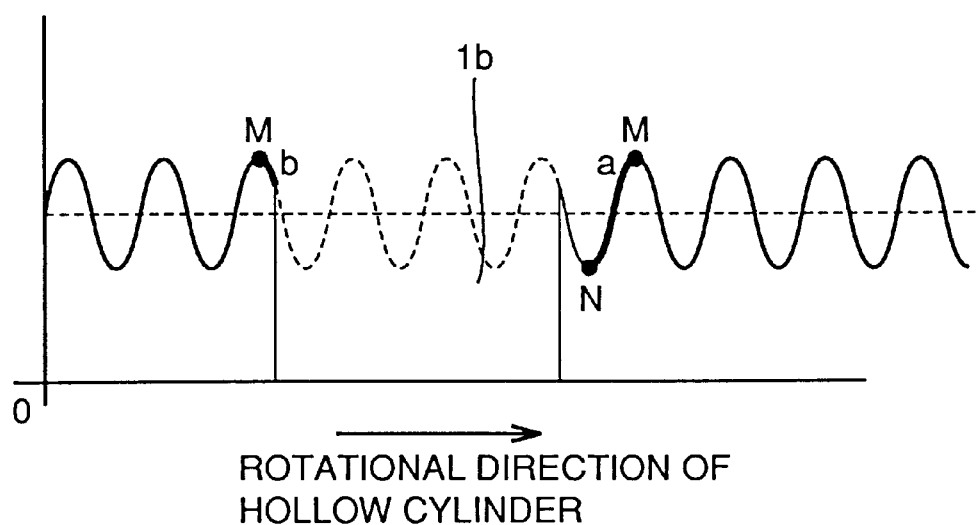
FIG. 12 is a diagram showing displacement of outer peripheral positions with respect to rotation angles at a time of rotating a shaft body about an axis in such case that maximal points and minimal points on the outer peripheral shape of the shaft body are present in short cycles and grooves include a plurality of positions to become the maximal points and the minimal points.

When maximal points M and minimal points N on the outer peripheral shape of the shaft body 1 are present in short cycles and a groove $1b$ is therefore formed over a plurality of portions to become the maximal points M and the minimal points N as shown in FIG. 12, the outer peripheral length in the forward rotational direction becomes the distance between an edge E and the maximal point M in case of including no minimal point N between adjacent maximal points M with respect to the edge E of the groove, and becomes the distance between the minimal point N and the maximal point M if any minimal point N is present.

Examples of the present invention are now described on the basis of drawings.

EXAMPLE 1

In a dynamic pressure bearing of combination of a circular cylindrical shaft body and a hollow cylindrical bearing body, a circular cylinder of a section having m swellings (maximal points) in one round as shown in FIG. 1 and FIG. 2 was prepared by employing a centerless grinder. It was assumed here that m=3, and the ratio of δ/C defining the shape of the circular cylinder section described with reference to FIG. 3 was set at $1 \times 10^{-4}$. Silicon nitride-based ceramics was employed for the shaft body 1 and the bearing body 2. The silicon nitride-based ceramics was prepared as follows:

Material powder of $Si_3N_4$ having a mean particle diameter of 0.3 μm, particle size distribution of 3σ=0.20 μm, an α crystallization ratio of 96.5% and an oxygen content of 1.4 weight % was prepared. Wet mixing was performed in ratios of 90 weight % of this material powder of $Si_3N_4$, 4 weight % of $Y_2O_3$ powder having a mean particle diameter of 0.08 μm, 3 weight % of $Al_2O_3$ powder having a mean particle diameter of 0.5 μm, 1 weight % of AlN powder having a mean particle diameter of 1.10 μm, and 2 weight % of MgO powder having a mean particle diameter of 0.5 μm in ethanol for 100 hours through a ball milling by using nylon ball. Thereafter mixed powder obtained by drying was CIP (cold isostatic pressing)—formed with pressure of 3000 kgf/cm². The obtained compact was held in a nitrogen gas atmosphere of 1 atmospheric pressure at a temperature of 1450° C. for six hours. Further, the compact was primarily sintered at a temperature of 1550° C. for three hours. The obtained sintered body was secondarily sintered at a temperature of 1600° C. in a nitrogen gas atmosphere of 1000 atmospheric pressure for one hour.

The silicon nitride-based sintered body obtained in this manner contained crystal grains whose linear density per length of 30 μm was at least 35, and the volume ratio of its grain boundary phase was not more than 15 volume %. Further, the silicon nitride-based sintered body contained pores whose maximum diameter was not more than 20 μm, and the content of the pores was not more than 3%.

With respect to the obtained circular cylinders grooves $1b_1$, $1b_2$ and $1b_3$ were prepared in prescribed positions by machining, for preparing the shaft body 1. The groove working on this circular cylinder surface was executed as follows: While the case of vertically using the bearing body 2, rendering the shaft body 1 and the bearing body 2 a fixed shaft and a rotator, and rendering the rotational direction on the CCW direction side here, this also applies to the case of transversely using the bearing body, and the positions of groove working may be reversed from this Example in case of using the bearing body while rotating the same in the clockwise direction (CW direction) in the figure.

Marking indicating a measurement start position was performed on a position of an upper end surface of the circular cylinder forming the shaft body 1 close to a side surface, the circular cylinder was rotated for measuring a profile of a section, and the profile shown in FIG. 2 was obtained, for example. However, the grooves $1b_1$, $1b_2$ and $1b_3$ were not yet formed at this point of time, and the sectional profile becomes a profile with no displacement of positions by the grooves in FIG. 2.

In the profile shown in FIG. 2, the axis of abscissas shows rotation angles at times of rotating the circular cylinder from the marking position, and the axis of ordinates shows displacement of the positions with respect to the same. The positions of the grooves were so decided that the direction where the angle increased was the rotational direction of the shaft body 1 and the grooves were on sides of larger angles than the maximal points with respect to the rotational direction. Namely, the positions of the respective grooves were so decided that the groove $1b_1$, the groove $1b_2$ and the groove $1b_3$ were on the sides of larger angles than the maximal point $M_1$, the maximal point $M_2$ and the maximal point $M_3$ respectively. Groove working was performed with reference to the marking position made on the circular cylinder for preparing the shaft body 1. While this groove working was executed by cutting work, it is assumed that the working method does not particularly count for much.

These grooves $1b_1$, $1b_2$ and $1b_3$ were so arranged that the sum ($a_1+a_2+a_3$) of the outer peripheral lengths in the forward rotational direction was in excess of the sum ($b_1+b_2+b_3$) of the outer peripheral lengths in the reverse rotational direction when the bearing 2 rotated relatively in the CCW direction side with respect to the shaft body 1, as hereinabove described. The current ratio of the depth to the diameter of the grooves was set at 0.01.

In this bearing body structure shown in FIG. 1, that rotating the bearing body 2 in the CCW direction side with respect to the shaft body 1 was regarded as an inventive sample, and that rotating the same in the CW direction side was regarded as a comparative sample 1, for measuring floating rotational frequencies.

Figure 18:
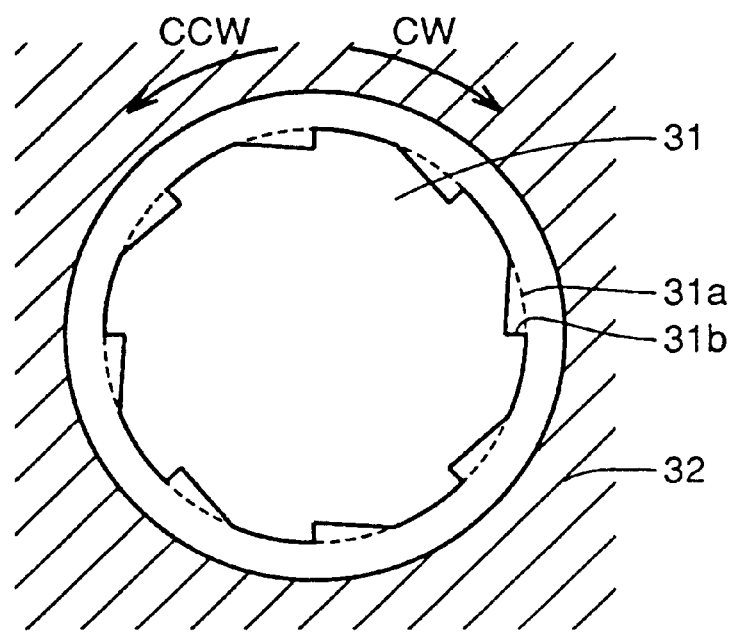
FIG. 18 is a sectional view of a principal part of a dynamic pressure gas bearing structure disclosed in Japanese Patent Publication No. 4-21844.

The bearing body structure shown in FIG. 18 was also similarly prepared, and that rotating the bearing body 32 relatively in the CCW direction side with respect to the shaft body 31 was regarded as a comparative example 2 while that rotating the same in the CW direction side was regarded as a comparative sample 3 for measuring floating rotational frequencies. As to this floating rotational frequency, measurement was made in the following manner with a floating rotational frequency measuring apparatus shown in FIG. 13.

Figure 13:
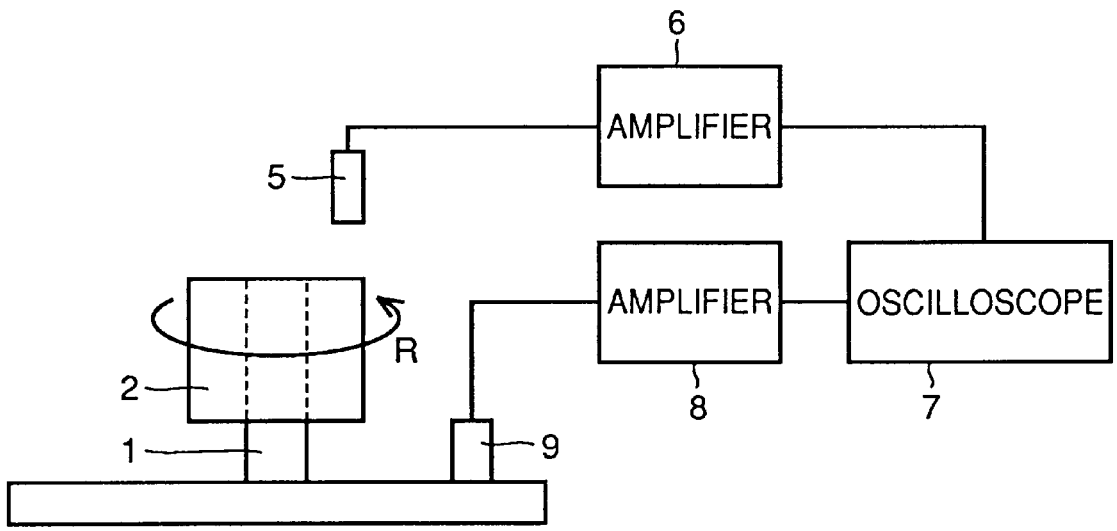
FIG. 13 is a model diagram showing a method of measurement of a floating rotational frequency.
Figure 14:
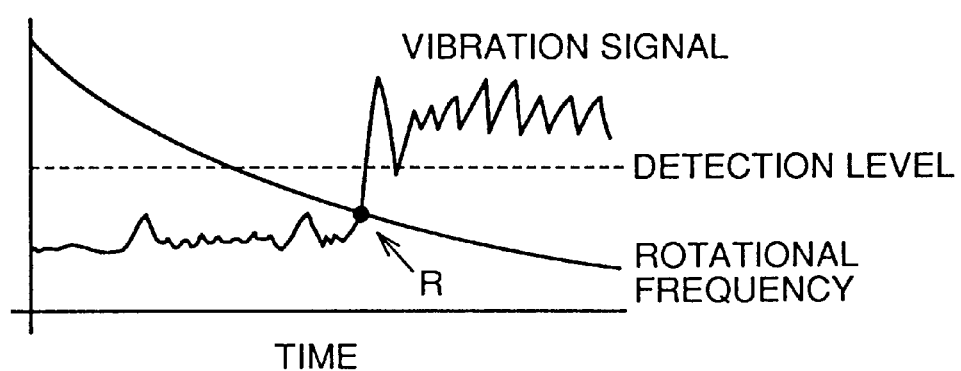
FIG. 14 is a graph showing the relation between a vibration signal and a rotational frequency for illustrating the measurement of the floating rotational frequency.

Referring to FIG. 13, the bearing body 2 was first rotated at several 1000 rpm with respect to the shaft body 1. Thereafter vibration and a rotational frequency up to a time when the bearing body 2 naturally stopped were detected by a vibration sensor 9 and a rotational speed sensor 5 respectively, and information thereof was monitored by an oscilloscope 7 through amplifiers 6 and 8. A rotational speed (rotational frequency) R at a time when a floating support effect by dynamic pressure disappeared and the level of a vibration signal rapidly increased due to contact between the bearing body 2 and the shaft body 1 was regarded as the floating rotational frequency as shown in FIG. 14. Results thereof are shown in the following Table 1.

TABLE 1

|  | Inventive Sample | Comparative Example 1 | Comparative Sample 2 | Comparative Sample 3 |
| --- | --- | --- | --- | --- |
| Floating Rotational Frequency [rpm] | 350 | 6000 | 2600 | 3500 |

First it was proved that the floating rotational frequency remarkably reduced in the inventive sample rotating the bearing body 2 in the CCW direction with respect to the shaft body 1 as compared with the comparative sample 1 rotating the bearing body 2 in the CW direction. It was further proved that the floating rotational frequency remarkably reduced in the inventive sample also as compared with the comparative samples 2 and 3 shown in FIG. 18. This is described as follows:

In the bearing structure of the comparative samples 2 and 3 shown in FIG. 18 the shaft body 31 is in a structure merely arranging the grooves 31b with respect to the outer peripheral shape of the substantially complete round 31a. Dynamic pressure caused between the shaft body 31 and the bearing body 32 in low-speed rotation is not sufficiently generated since flow of air is disturbed due to irregularity by the grooves 31b on the surface of the shaft body 31.

In the inventive sample, on the other hand, not only the outer peripheral shape has the grooves $1b_1$, $1b_2$ and $1b_3$ but has the maximal points $M_1$, $M_2$ and $M_3$ and the minimal points $N_1$, $N_2$ and $N_3$ as shown in FIG. 1. The tapers formed by the maximal points and the grooves are relatively long on the rotational direction sides along the maximal points. It has been conceivably possible to thereby float the shaft body with respect to the bearing body at a low rotational frequency for bringing the same into a noncontact state.

Further, the positions for working the grooves were changed in FIG. 1, the ratio of the outer peripheral length $a_1$ in the forward rotational direction to the outer peripheral length $b_1$ in the reverse rotational direction was changed, and floating rotational frequencies as to the case of $a_1/b_1 \geq$ and the case of $a_1/b_1 < 1$ were measured. Results thereof are shown in the following Table 2.

TABLE 2

|  | a/b ≧ 1 | *a/b < 1 |
|---|---|---|
| Floating Rotational Frequency [rpm] | 420 | 2800 |

*: comparative sample

From the results of Table 2, the floating rotational frequency was low, and a result of start/stop endurance was also excellent in the inventive sample of $a_1/b_1 \geq 1$ as compared with the comparative sample of $a_1/b_1 < 1$. In the comparative sample of $a_1/b_1 < 1$, on the other hand, sufficient dynamic pressure necessary for floating was not obtained in a low rotational speed area, and it is conceivable that the shaft body 1 and the bearing body 2 directly slide up to a high speed to cause friction damage as a result.

EXAMPLE 2

Then in the bearing body structure shown in FIG. 1, floating rotational frequencies in case of changing the ratio of the sum $\Sigma a$ ($=a_1+a_2+a_3$) of the outer peripheral lengths in the forward rotational direction to the sum $\Sigma b$ ($=b_1+b_2+b_3$) of the outer peripheral lengths in the reverse rotational direction were measured. Results thereof are shown in the following Table 3.

TABLE 3

|  | Σa/Σb ≧ 1 | *Σa/Σb < 1 |
|---|---|---|
| Floating Rotational Frequency [rpm] | 450 | 3200 |

*: comparative sample

From the results of Table 3, it was proved that the floating rotational frequency remarkably reduced and a start/stop endurance test was also excellent in the inventive sample of $\Sigma a/\Sigma b \geq 1$, as compared with the comparative sample of $\Sigma a/\Sigma b < 1$.

EXAMPLE 3

In a shaft body 1 having a circular cylindrical section having at least four swellings (maximal points) in one round, grooves were formed in three portions in accordance with the aforementioned Examples 1 and 2, and floating rotational frequencies were measured.

That prepared by deciding the positions of the grooves so that the sum $\Sigma a$ of the outer peripheral lengths in the forward rotational direction was larger than the sum $\Sigma b$ of the outer peripheral lengths in the reverse rotational direction and performing working in relation to the rotation component of the circumference defined in the above was regarded as an inventive sample. On the other hand, that prepared by deciding the positions of the grooves so that the sum $\Sigma a$ of the outer peripheral lengths in the forward rotational direction was smaller than the sum $\Sigma b$ of the outer peripheral lengths in the reverse rotational direction and performing working was regarded as a comparative sample. Respective floating rotational frequencies in case of setting the numbers of maximal points at 5, 9 and 23 as to these inventive sample and comparative sample respectively were measured. Results thereof are shown in the following Table 4.

TABLE 4

|  | m = 5 | m = 9 | m = 23 |
|---|---|---|---|
| Inventive Sample [rpm] | 400 | 420 | 380 |
| Comparative Sample [rpm] | 4500 | 5000 | 5200 |

From the results of Table 4 it was proved possible to reduce the floating rotational frequency according to the present invention even if the number of the maximal points increases.

EXAMPLE 4

Study was made on floating rotational frequencies as to the case of setting $\delta/C$ defined in relation to the outer periphery of the shaft body 1 with reference to FIG. 3 at $1\times10^{-5}$ and $4\times10^{-5}$. Bearing structures having shaft bodies 1 provided with these respective $\delta/C$ and subjected to groove working in accordance with the inventive samples of the aforementioned Examples 1 and 2 were regarded as inventive samples. Furthers bearing structures having shaft bodies 1 provided with the respective $\delta/C$ and subjected to working of grooves at random were regarded as comparative samples. As to measurement of the floating rotational frequencies, 100 samples were prepared for each bearing structure, the shaft bodies 2 of each bearing structure were rotated in the CCW direction with respect to the shaft bodies 1, and the ratio of those having floating rotational frequencies of not more than 2000 rpm was obtained. A floating rotational frequency of not more than 2000 rpm is a rotational frequency causing no abrasion by contact until the bearing body 2 floats with respect to the shaft body 1. Results thereof are shown in the following Table 5.

TABLE 5

|  | Inventive Sample | Comparative Sample |
|---|---|---|
| Roundness 1 × 10⁻⁵ | 100% | 80% |
| Roundness 4 × 10⁻⁵ | 100% | 50% |

From the results of Table 5, 80% exhibits floating rotational frequencies of low values when the roundness of the circular cylinder is excellent ($1\times10^{-5}$), while the ratio becomes 50% when the roundness is inferior ($4\times10^{-5}$). In the inventive samples, on the other hand, it is possible to control the floating rotational frequencies to low values of not more than 2000 rpm by 100%. From these results, it is understood that when groove working is performed in accordance with the inventive samples of Examples 1 and 2, floating rotational frequencies with respect to specific directions can be reduced even if working accuracy of the shaft bodies 1 is low, and hence it is industrially useful too.

EXAMPLE 5

As shown in FIG. 8 and FIG. 9, a circular cylinder of a section having m swellings (maximal points) in one round was prepared. Any of combination of a shaft body 1 and a bearing body 2 in this case was made of silicon nitride ceramics, and the silicon nitride ceramics was assumed to be as follows.

This silicon nitride ceramics was obtained by forming mixed powder prepared by adding 0.02 weight % of Fe having a mean particle diameter of 1.0 μm to mixed powder of 91 weight % of commercially available $Si_3N_4$ powder (α crystallization ratio, 95%, mean particle diameter: 0.5 μm), 4.5 weight % of $Y_2O_3$ powder having a mean particle diameter of 0.6 μm and 4.5 weight % of $Al_2O_3$ powder having a mean particle diameter of 0.7 μm (blending volume ratio of a sintering assistant in this case becomes 7.0 volume % assuming that theoretic densities of $Si_3N_4$, $Y_2O_3$ and $Al_2O_3$ are 3.4 g/cm³, 5.0 g/cm³ and 4.0 g/cm³ respectively), performing heat treatment for two hours under such conditions that pressure of $N_2$ was 380 torr and a temperature was 1200° C., and thereafter performing sintering under nitrogen normal pressure at 1700° C. for three hours.

In the silicon nitride-based sintered body thus obtained, the porosity was 2.1%, while the maximum diameter of the pores was 30 μm, and the grain boundary phase was 7 volume %. When areas of all silicon nitride crystal grains present in an arbitrary two-dimensional section were measured, the total area occupied by silicon nitride crystal grains in an area of 0.1 to 10 μm² was 77% of the silicon nitride crystal grain total area, and the number ratio occupied by silicon nitride crystal grains having aspect ratios of 2 to 10 in all silicon nitride crystal grains was 35%.

With respect to the obtained circular cylinder, grooves were formed by machining. The ratio of the depth of each groove to the diameter (C defined in FIG. 3) at this time was set at 0.01, and the number of the grooves was set at 3. Respective grooves $1b_1$, $1b_2$ and $1b_3$ are formed in positions of the shaft body 1 to become maximal points $M_1$, $M_2$ and $M_3$. These maximal points $M_1$, $M_2$ and $M_3$ may be maximal points $M_1$, $M_2$ and $M_3$ which can determine the outer peripheral shape of the shaft body 1 other than the groove forming region by the least squares method. Those rotating the bearing body 2 in the CCW direction with respect to the shaft body 1 in the bearing structure shown in FIG. 8 were regarded as inventive samples and that rotating the bearing body 2 in the CW direction with respect to the shaft body 1 in the bearing structure shown in FIG. 1 was regarded as a comparative sample, for measuring respective floating rotational frequencies. Results thereof are shown in the following Table 6. No. 1 is that of a taper length Σa=Σb, and No. 2 is that of Σa>Σb.

TABLE 6

|  | Inventive Sample | | Comparative Sample |
| --- | --- | --- | --- |
|  | No. 1 | No. 2 |  |
| Floating Rotational Frequency [rpm] | 400 | 230 | 6000 |

From the results of Table 6, it was proved that remarkably low floating rotational frequencies can be obtained in the inventive samples as compared with the comparative sample. As to this, it is conceivable that the tapers from the minimal points to the groove edges are sufficiently long and dynamic pressure is efficiently generated in the inventive samples, while no sufficient dynamic pressure was generated and the contact rotational frequency increased since the taper contributing to generation of dynamic pressure was short in the comparative sample.

On the other hand, that rotating the bearing body 2 in the CW direction with respect to the shaft body 1 in the bearing structure shown in FIG. 8 were regarded as an inventive sample, and its floating rotational frequency was measured. Comparative samples were prepared from the comparative sample of Table 6 and No. 2. Results thereof are shown in the following Table 7.

TABLE 7

|  | No. 1 | *No. 2 | Comparative Sample |
| --- | --- | --- | --- |
| Floating Rotational Frequency [rpm] | 400 | 2400 | 6000 |

*: comparative sample

From the results of Table 7, it was proved that a low floating rotational frequency is attained in whichever one of the CCW direction and the CW direction the bearing body 2 is rotated with respect to the shaft body 1 when the structure is the bearing structure shown in FIG. 8 and the taper lengths Σa and Σb on the circumference satisfy Σa=Σb through the grooves. This is conceivably because dynamic pressure generation by an effect of a wedge-shaped clearance is effectively performed since the taper lengths are sufficient with respect to any rotational direction of CW and CCW in the inventive sample.

EXAMPLE 6

Study was made on floating rotational frequencies in case of setting δ/C defined in relation to the shaft body 1 with reference to FIG. 3 at $1 \times 10^{-5}$ and $4 \times 10^{-5}$. Those having the respective δ/C and rotating the bearing body 2 with respect to the shaft body 1 in the CCW direction in the bearing structure shown in FIG. 8 were regarded as inventive samples. Further, those having the respective δ/C and having shaft bodies 1 working grooves at random were regarded as comparative samples. As to measurement of the floating rotational frequencies, 100 samples were prepared for each bearing structure, the bearing bodies 2 of each bearing structure were rotated, and the ratio of those having floating rotational frequencies of not more than 2000 rpm was obtained. Results thereof are shown in the following Table 8.

TABLE 8

|  | Inventive Sample | Comparative Sample |
| --- | --- | --- |
| Roundness $1 \times 10^{-5}$ | 100% | 80% |
| Roundness $4 \times 10^{-5}$ | 100% | 50% |

From the results of Table 8, it was possible to obtain floating rotational frequencies of not more than 2000 rpm in all bearing structures in the inventive samples in relation to any δ/C.

Thus, it was proved that the floating rotational frequency can be reduced in the bearing structure shown in FIG. 8 even if working accuracy of the shaft body 1 is low, and it is industrially useful too.

EXAMPLE 7

In a dynamic pressure bearing of combination of a circular cylindrical shaft body 1 and a hollow cylindrical bearing body 2, a circular cylinder of a section having m swellings (maximal points) in one round was prepared as shown in FIG. 6.

With respect to the obtained circular cylinder, grooves were formed by machining. The ratio of the depth of the grooves to the diameter (C defined in FIG. 3) at this time was set at 0.01, and the number of the grooves was set at three. In inventive samples, respective grooves $1b_1$, $1b_2$ and $1b_3$ are formed in positions to define minimal points $N_1$, $N_2$ and $N_3$. The minimal points $N_1$, $N_2$ and $N_3$ coincide with minimal points obtained as a result of curve-interpolating an outer peripheral shape other than the grooves with the least squares method. In this shape, the grooves are so formed that the sum $\Sigma a$ of outer peripheral lengths $a_1$, $a_2$ and $a_3$ in the forward rotational direction and the sum $\Sigma b$ of outer peripheral lengths $b_1$, $b_2$ and $b_3$ in the reverse rotational direction are $\Sigma a = \Sigma b$ (No. 1), or $\Sigma a > \Sigma b$ (No. 2). Those rotating the bearing body 2 in the CCW direction with respect to the shaft body 1 in the bearing structure shown in FIG. 6 were regarded as inventive samples and that rotating the bearing body 2 in the CW direction with respect to the shaft body 1 in the bearing structure shown in FIG. 1 was regarded as a comparative sample for measuring floating rotational frequencies. Results thereof are shown in the following Table 9.

TABLE 9

|  | Inventive Sample | | Comparative Sample |
|---|---|---|---|
|  | No. 1 | No. 2 |  |
| Floating Rotational Frequency [rpm] | 320 | 190 | 6000 |

From the results of Table 9, it was proved that the inventive samples exhibit low floating rotational frequencies as compared with the comparative sample. This is conceivably because dynamic pressure is effectively generated since tapers from the groove edges to the maximal points are sufficiently long in the inventive samples, while sufficient dynamic pressure was not generated but the contact rotational frequency increased since tapers contributing to generation of dynamic pressure were short in the comparative sample.

On the other hand, that rotating the bearing body 2 in the CW direction with respect to the shaft body 1 in the bearing structure shown in FIG. 6 was regarded as an inventive sample, and its floating rotational frequency was measured. Comparative samples were prepared from the comparative sample of Table 6 and No. 2. Results thereof are shown in the following Table 10.

TABLE 10

|  | No. 1 | *No. 2 | *Comparative Sample |
|---|---|---|---|
| Floating Rotational Frequency [rpm] | 320 | 2350 | 6000 |

*: comparative sample

From the results of Table 10, it was proved that the bearing structure shown in FIG. 6 in which the taper lengths on the outer periphery are $\Sigma a = \Sigma b$ can obtain a low floating rotational frequency in whichever one of the CCW direction and the CW direction the bearing body 2 is rotated with respect to the shaft body 1.

This is conceivably because dynamic pressure generation by an effect of a wedge-shaped clearance is effectively performed since the lengths of tapers are sufficient with respect to any rotational direction of CW and CCW in the inventive sample.

EXAMPLE 8

Study was made on floating rotational frequencies in case of setting $\delta/C$ defined in relation to the shaft body 1 with reference to FIG. 3 at $1 \times 10^{-5}$ and $4 \times 10^{-5}$. Those having the respective $\delta/C$ and having shaft bodies 1 subjected to groove working as shown in FIG. 6 were regarded as inventive samples. Further, those having the respective $\delta/C$ and having shaft bodies 1 working grooves at random were regarded as comparative samples. As to measurement of the floating rotational frequencies, 100 samples were prepared for each bearing structure, the bearing bodies 2 of each bearing structure were rotated with respect to the shaft bodies 1, and the ratio of those having floating rotational frequencies of not more than 2000 rpm was obtained. Results thereof are shown in the following Table 11.

TABLE 11

|  | Inventive Sample | Comparative Sample |
|---|---|---|
| Roundness $1 \times 10^{-5}$ | 100% | 80% |
| Roundness $4 \times 10^{-5}$ | 100% | 50% |

From the results of Table 11, it was possible to obtain floating rotational frequencies of not more than 2000 rpm in all bearing structures in relation to either $\delta/C$ in the inventive samples. Thus, it was proved that floating rotational frequencies with respect to specific directions can be reduced even if the working accuracy of th shaft bodies 1 is low in the inventive samples, and these are industrially useful too.

EXAMPLE 9

In relation to the silicon nitride shaft body and the bearing body prepared in Example 5, working of grooves was executed so that distances ($OE_1$ and $OE_2$) from an axis O of the shaft body 1 to respective edges $E_1$ and $E_2$ of the grooves were $OE_1 < OE_2$ in such case that air in a bearing clearance formed when the shaft body 1 and the bearing body 2 were oppositely arranged as shown in FIG. 10 flew in the direction from the edge $E_2$ to the edge $E_1$. The grooves were worked to have the shapes shown in FIG. 10, by forming the grooves in the longitudinal direction of the axis by cutting and grinding a circumferential surface including edge portions on single sides of the grooves with free abrasive grains or the like, for example.

Inventive samples were prepared from those satisfying the aforementioned conditions and forming grooves in positions corresponding to the comparative sample of Example 2, and roundness of the shaft bodies 1 was set at $1 \times 10^{-5}$ and $4 \times 10^{-5}$.

The comparative sample 1 of Example 1 was employed as comparative samples.

TABLE 12

|  | Roundness | Inventive Sample | Comparative Sample |
|---|---|---|---|
| Floating Rotational Frequency | $1 \times 10^{-5}$ | 250 rpm | 2800 rpm |
|  | $4 \times 10^{-5}$ | 620 rpm | 4500 rpm |

From results of Table 12, floating rotational frequencies are remarkably low in the inventive samples rendering the shapes of the grooves $OE_1>OE_2$ as compared with the comparative samples 1 in which taper angles of the grooves are symmetrical. Thus, it was proved that the floating rotational frequency can be reduced by making the groove shapes as described above even if the groove positions are the worst in Example 2, regardless of the forming positions of the grooves.

EXAMPLE 10

In relation to the silicon nitride shaft body and the bearing body prepared in Example 5, grooves having the taper shape shown in FIG. 11 were formed on the shaft body 1. The grooves were so formed that taper angles $\theta_1$ and $\theta_2$ were $\theta_1>\theta_2$ in such case that air in a bearing clearance formed when the shaft body 1 and the bearing body 2 were oppositely arranged flew from the maximal point $M_2$ to the maximal point $M_1$ side through the groove $1b_1$, and this was employed to prepare inventive samples. Further, comparative samples were prepared from those obtained by forming grooves so that taper angles of the grooves were $\theta_1 \leq \theta_2$.

In both of the inventive samples and the comparative samples, the grooves were formed in positions corresponding to the comparative samples of Example 2, roundness of the shaft bodies was set at $1\times10^{-5}$ and $4\times10^{-5}$, and the taper angles $\theta_1$ and $\theta_2$ were changed as in the following Table 13 for measuring floating rotational frequencies. Results thereof are shown in the following Table 14.

TABLE 13

|  | No. 1 | No. 2 | No. 3 | *No. 4 | *No. 5 |
|---|---|---|---|---|---|
| $\theta_1$ | 90° | 60° | 45° | 30° | 45° |
| $\theta_2$ | 30° | 45° | 15° | 90° | 45° |

*: comparative sample

TABLE 14

|  | Roundness | No. 1 | No. 2 | No. 3 | *No. 4 | *No. 5 |
|---|---|---|---|---|---|---|
| Floating Rotational Frequency [rpm] | $1 \times 10^{-5}$ | 330 | 270 | 240 | 2600 | 2800 |
|  | $4 \times 10^{-5}$ | 510 | 560 | 610 | 3700 | 4100 |

*: comparative sample

From the results of Table 14, the floating rotational frequencies were remarkably low in the inventive samples rendering the taper shapes of the grooves $\theta_1>\theta_2$ as compared with No. 5 of the comparative sample in which the taper angles of the grooves were symmetrical, and it was proved that the floating rotational frequency can be reduced by making the groove shapes as described above even if the groove positions are the worst in Example 2, regardless of the forming positions of the grooves.

EXAMPLE 11

Methods of using dynamic pressure gas bearing structures according to inventive examples are now described with reference to FIG. 15 and FIG. 16.

Figure 15:
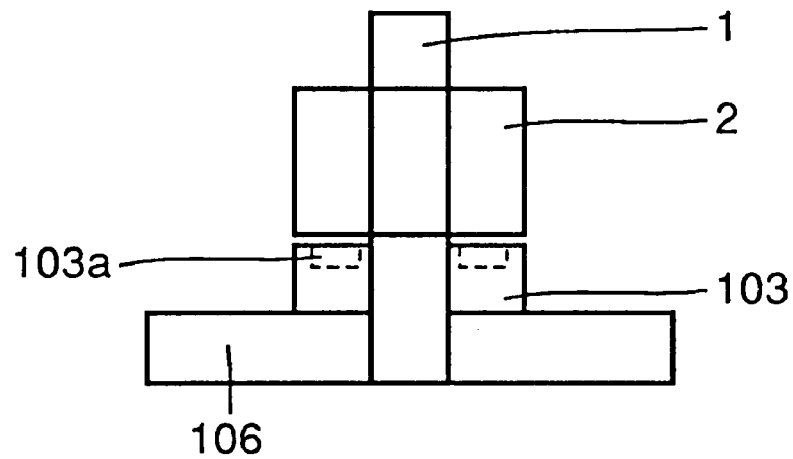
FIG. 15 is a schematic diagram showing one example of a dynamic pressure bearing structure to which the dynamic pressure gas bearing structure of the present invention is applied.
Figure 16:
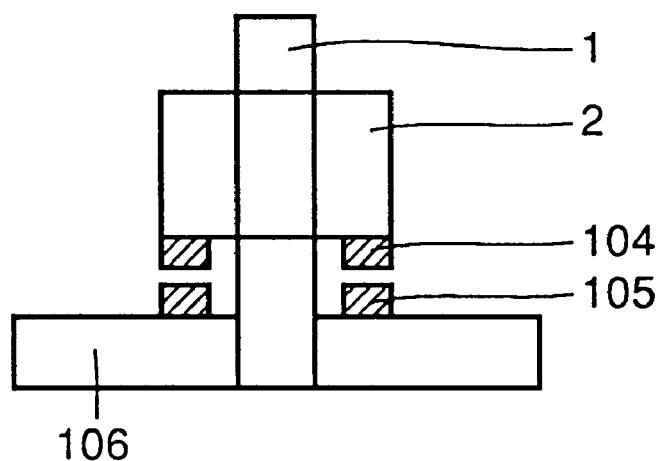
FIG. 16 is a schematic diagram showing another example of a dynamic pressure bearing structure to which the dynamic pressure gas bearing structure of the present invention is applied.

In each of dynamic pressure bearing structures shown in FIG. 15 and FIG. 16, radial supporting consists of a shaft body 1 and a bearing body 2 forming the inventive dynamic pressure bearing structure, an end is so fixed that the shaft body 1 is perpendicular to a base 106, and the bearing body 2 is rotatably set on the shaft body 1.

In the dynamic pressure bearing structure shown in FIG. 15, thrust supporting is formed by an end surface of the bearing body 2 and a dynamic pressure thrust bearing 103 having a spiral groove 103a opposed thereto.

In the dynamic pressure bearing structure shown in FIG. 16, thrust supporting is formed by a ring-shaped permanent magnet 104 which is fixed to an end surface of the bearing body 2 and a ring-shaped permanent magnet 105 which is fixed to a base 106 to be coaxial with the shaft body 1 oppositely to this ring-shaped permanent magnet 104. Both of these ring-shaped permanent magnets 104 and 105 are magnetized in the axial direction, and so arranged that magnetic poles thereof are in repulsive directions to each other.

If the aforementioned dynamic pressure gas bearing structure of the present invention is used only in the CCW direction, the shaft body 1 is so set that the relations between the outer peripheral tapers of the grooves and the shaft body and the shapes of the grooves are those in FIGS. 1, 6, 8, 10 and 11 as viewed from an end surface opposite to the fixed end. At this setting, the structure may be fixed in a regular direction with the shaft body 1 subjected to groove working while previously defining the rotational direction by the method heretofore described in detail, or the grooves may be formed while providing reversibility to the shaft body 1, i.e., so that the grooves are present in sliding parts with the bearing body 2 whichever end portion of the shaft body 1 is fixed, for confirming the shapes before setting the shaft body 1 and deciding the fixing direction.

It is possible to hold the shaft body 1 and the bearing body 2 in a noncontact manner from low-speed rotation by deciding the fixing direction of the shaft body 1 in this manner and rotating/using the shaft body 1 and the bearing body 2 in a prescribed rotational direction, and the time and the speed for direct contact sliding of the shaft body 1 and the bearing body 2 following starting/stopping of the dynamic pressure gas bearing structure can be reduced. Consequently, it is possible to prevent damage of the bearing structure caused by abrasion.

EXAMPLE 12

Figure 17:
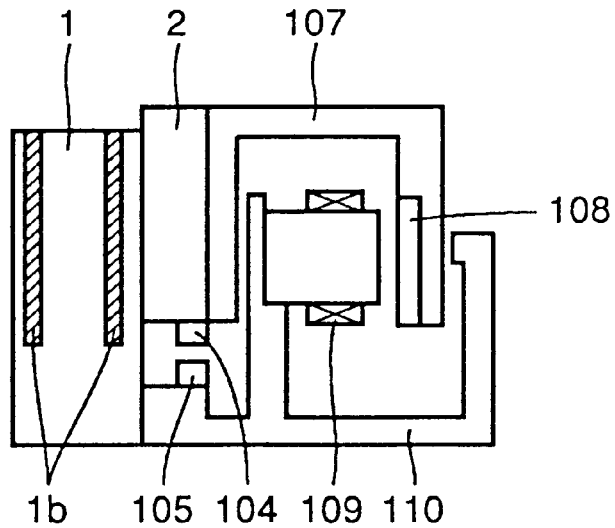
FIG. 17 is a schematic diagram showing a spindle motor whose rotor hub rotates, to which the dynamic pressure gas bearing structure of the present invention is applied.

FIG. 17 is a diagram schematically showing a spindle motor whose rotor hub rotates. Referring to FIG. 17, a motor is formed by a motor rotor magnet 108 provided on an inner peripheral side of a hub 107 which is on a rotating side and a stator coil 109 provided on a fixed side, so that the hub 107 can be rotated at a high speed. The stator coil 109 is fixed to a base 110, and a shaft body 1 is similarly fixed as a fixed shaft coaxially with the stator coil 109.

A bearing body 2 is fixed to the hub 107 by either method of shrinkage fitting or adhesion. The shaft body 1 and the bearing body 2 form a radial bearing. Grooves $1b$ are formed on the shaft body 1 in a longitudinal direction of its axis, whereby a dynamic pressure effect is attained as a result of interaction of outer peripheral tapers of the shaft body 1 and the groove $1b$ portions, and the bearing body 2 is rotated/supported in a noncontact manner in the radial direction at a rotational frequency in excess of a floating rotational frequency. While a thrust bearing supporting a load in a thrust direction is assembled into an end of the hub 107 under the bearing body 2 ring-shaped permanent magnets 104 and 105 are provided on a lower end of the bearing body 2 and the base to repulsively support each other with a proper space in this Example.

In the motor of this structure, no ½ whirl takes place even in high-speed rotation of at least 30000 rpm due to an aerodynamic effect of the grooves $1b$.

When a control circuit or the like is so set that this motor rotates only in the CCW direction, the shaft body 1 is formed as shown in FIGS. 1, 6, 8, 10 and 11 as viewed from an end surface opposite to its fixed side.

Therefore, the floating rotational frequency can be controlled low even if starting/stopping of rotation of this motor is repeated, whereby it is possible to obtain a motor which is capable of high-speed rotation in a simple structure, has high rotational accuracy, and causes no abrasion damage.

As to the grooves in all embodiments and Examples of the present invention described above, it is preferable that at least single ends communicate with the outside air. This is because at least single ends of the grooves must communicate with the outside air for causing axial air flows.

The outer peripheral tapers of the shaft body, which are defined by the edges of the grooves and the lengths up to the maximal points adjacent thereto, are defined by the lengths of the minimal points and the maximal points when the minimal points are present therebetween. This is a unified concept in this specification, regardless of the number of the grooves and the number of the maximal values of the closed curve forming the shaft.

The Examples and embodiments disclosed this time must be regarded as illustrative in all points and not restrictive. The scope of the present invention is shown not by the scope described in the above but by claims, and it is intended that all changes within the meaning and scope equal to claims are included.

As hereinabove described, a low floating rotational frequency can be implemented in the dynamic pressure gas bearing structure according to the present invention, and hence occurrence of galling of the shaft body and the bearing body is suppressed also when the same is employed for an HDD or the like, for example.

INDUSTRIAL AVAILABILITY

The present invention relates to a dynamic pressure gas bearing structure and a method of manufacturing the same as well as a method of using the same, and is advantageously applicable particularly to a dynamic pressure gas bearing structure comprising a circular cylindrical shaft body having a groove on its outer periphery and a hollow cylindrical bearing body opposed to the shaft body with a space in the radial direction.

We claim:

1. A dynamic pressure gas bearing structure comprising a circular cylindrical shaft body and a hollow cylindrical bearing body being opposed to said shaft body with a clearance in the radial direction, wherein
    a cross-sectional shape of said shaft body being perpendicular to its axis
    has a shape defined by a closed curve having a plurality of maximal points whose distances from the axis are maximized about the axis and a plurality of minimal points whose distances from the axis are minimized, and
    has a groove forming region provided with at least one groove at least between adjacent first and second maximal points among a plurality of said maximal points, and
    $A \geq B$ is satisfied assuming that A represents the distance from an end portion of the groove closest to said first maximal point in said groove forming region to said first maximal point along said closed curve and B represents the distance from an end portion of the groove closest to said second maximal point in said groove forming region to said second maximal point along said closed curve.

2. The dynamic pressure gas bearing structure in accordance with claim 1, wherein said closed curve has third and fourth maximal points being adjacent to each other, and
    has a second groove forming region provided with at least one groove between said third and fourth maximal points, and
    $A+A_1 \geq B+B_1$ is satisfied assuming that $A_1$ represents the distance from an end portion of the groove closest to said third maximal point in said second groove forming region to said first maximal point along said closed curve and $B_1$ represents the distance from an end portion of the groove closest to said fourth maximal point in said second groove forming region to said fourth maximal point along said closed curve.

3. The dynamic pressure gas bearing structure in accordance with claim 1, wherein the groove is arranged on the outer periphery of the shape defined by said closed curve in a portion forming said minimal point in said groove forming region.

4. A method of using the dynamic pressure gas bearing structure in accordance with claim 1, for using said bearing structure so as to feed air in a clearance being formed in case of oppositely arranging said shaft body and said hollow cylindrical bearing body from said first maximal point to said second maximal point through said groove forming region in relation to relative rotational motion of said shaft body.

5. A dynamic pressure gas bearing structure comprising a circular cylindrical shaft body and a hollow cylindrical bearing body being opposed to said shaft body with a clearance in the radial direction, wherein
    a cross-sectional shape of said shaft body being perpendicular to its axis
    has a shape defined by a closed curve having a plurality of maximal points whose distances from the axis are maximized about the axis and a plurality of minimal points whose distances from the axis are minimized, and
    has a groove arranged on the outer periphery of the shape defined by said closed curve in a portion to form said maximal point.

6. The dynamic pressure gas bearing structure in accordance with claim 5, having first and second minimal points holding said maximal point being provided with said groove, and
    satisfying $A_3 \geq B_3$ assuming that $A_3$ represents the distance from an end portion of said groove arranged on the portion to form said maximal point on said first maximal point side to said first minimal point along said closed curve and $B_3$ represents the distance from an end portion of said groove arranged in the portion to form said second maximal point on said first minimal point side to said first minimal point along said closed curve.

7. A method of using the dynamic pressure gas bearing structure in accordance with claim 6, for using said bearing structure so as to feed air in a clearance being formed in case of oppositely arranging said shaft body and said hollow cylindrical bearing body from said first maximal point to said second maximal point through said groove in relation to relative rotational motion of said shaft body and said bearing body.

8. A dynamic pressure gas bearing structure comprising a circular cylindrical shaft body and a hollow cylindrical bearing body being opposed to said shaft body with a clearance in the radial direction, wherein a groove of at least one portion is formed on the outer periphery of said shaft body in a cross section of said shaft body being perpendicular to its axis, and assuming that $E_1$ represents a boundary point between one end of said groove and the outer periphery of said shaft body, $E_2$ represents a boundary point between another end of said groove and the outer periphery of said shaft body, and a central point O represents a point where said axis is positioned on said cross section, the number of such said groove that respective position vectors $\vec{r}_1$ and $\vec{r}_2$ from said central point O to said boundary points $E_1$ and $E_2$ satisfy the relation:

$$|\vec{r}_2| = k \times |\vec{r}_1| \ (k>1)$$

is at least the majority with respect to the total number of said groove.

9. A method of using the dynamic pressure gas bearing structure in accordance with claim 8, for using said bearing structure so as to feed air in a clearance being formed in case of oppositely arranging said shaft body and said hollow cylindrical bearing body in a position vector direction of $\vec{r}_1 - \vec{r}_2$ in relation to relative rotational motion of said shaft body and said bearing body.

10. The dynamic pressure gas bearing structure in accordance with claim 8, wherein the shape of said groove is defined by a bottom wall, a first side wall reaching said boundary point $E_1$ from an end of said bottom wall, and a second side wall reaching said boundary point $E_2$ from another end of said bottom wall, said groove has such a taper shape that the distance between said first and second side walls reduces toward said bottom wall from an outer peripheral side of said shaft body, and an angle formed by a first virtual plane extending from said one end of said bottom wall along said bottom wall and said first wall is larger than an angle formed by a second virtual plane extending from said another end of said bottom wall along said bottom wall and said second side wall.

11. A method of using the dynamic pressure gas bearing structure in accordance with claim 10, for using said bearing structure so as to feed air in a clearance being formed in case of oppositely arranging said shaft body and said hollow cylindrical bearing body from said said boundary point $E_2$ side to said boundary point $E_2$ side through said groove in relation to relative rotational motion of said shaft body and said bearing body.

12. A method of manufacturing a dynamic pressure gas bearing structure comprising a circular cylindrical shaft body and a hollow cylindrical bearing body being opposed to said shaft body with a clearance in the radial direction, comprising:

a step of forming a shaft body having an axis and having a cross-sectional shape perpendicular to said axis being defined by a closed curve having a plurality of maximal points whose distances from said axis are maximized about said axis and a plurality of minimal points whose distances from said axis are minimized so that the cross-sectional shape perpendicular to said axis becomes a shape being defined by δ and C assuming that all points on said closed curve are between two virtual concentric circles, δ represents the radial space between two said virtual concentric circles in such case that the distance of the radial space between two said virtual concentric circles is minimized and C represents the mean value of the diameters of two said virtual concentric circles; and a step of forming a groove forming region having at least one groove on the outer periphery of said shaft body at least between adjacent first and second maximal points among a plurality of said maximal points, wherein when said shaft body rotates about said axis in one rotational direction side relatively with respect to said shaft body, said first maximal point is positioned on said one rotational direction side of said groove forming region and said second maximal point is positioned on another rotational direction side of said groove forming region being reverse to said one rotational direction, and said shaft body is so formed as to satisfy $A \geq B$ assuming that A represents the distance from an end portion of the groove closest to said first maximal point in said groove forming region to said first maximal point along said closed curve and B represents the distance from an end portion of the groove closest to said second maximal point in said groove forming region to said second maximal point along said closed curve.

13. A method of manufacturing a dynamic pressure gas bearing structure comprising a circular cylindrical shaft body and a hollow cylindrical bearing body being opposed to said shaft body with a clearance in the radial direction, comprising:

a step of forming a shaft body having a cross-sectional shape perpendicular to its axis being defined by a closed curve having a plurality of maximal points whose distances from said axis are maximized about said axis and a plurality of minimal points whose distances from said axis are minimized so that the cross-sectional shape perpendicular to said axis becomes a shape being defined by δ and C assuming that all points on said closed curve are between two virtual concentric circles, δ represents the radial space between two said virtual concentric circles in such case that the distance of the radial space between two said virtual concentric circles is minimized and C represents the mean value of the diameters of two said virtual concentric circles; and a step of forming a groove on the position of at least one said maximal point of said shaft body.

* * * * *

UNITED STATES PATENT AND TRADEMARK OFFICE
CERTIFICATE OF CORRECTION

PATENT NO. : 5,944,427

DATED : Aug. 31, 1999

INVENTOR(S) : Murabe et al.

It is certified that error appears in the above-identified patent and that said Letters Patent is hereby corrected as shown below:

Please replace Fig. 11 as follows:

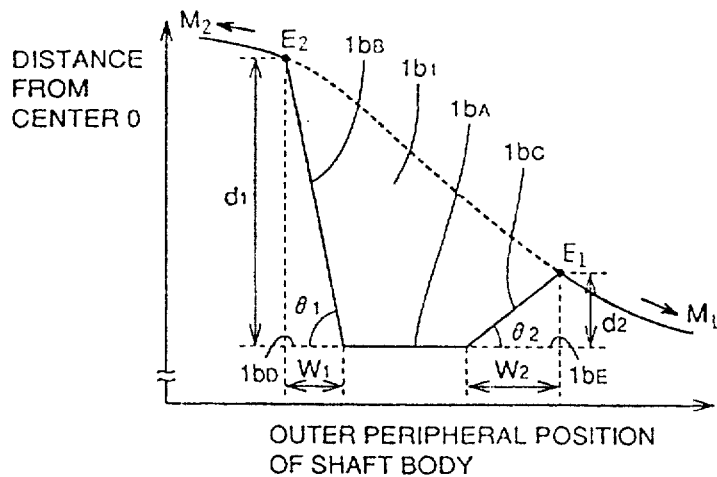

FIG.11

UNITED STATES PATENT AND TRADEMARK OFFICE
CERTIFICATE OF CORRECTION

PATENT NO. : 5,944,427

DATED : Aug. 31, 1999

INVENTOR(S) : Murabe et al.

It is certified that error appears in the above-identified patent and that said Letters Patent is hereby corrected as shown below:

On the Title Page:

Under "FOREIGN PATENT DOCUMENTS":
    line 1, before "Japan", replace "3/1975" by --3/1995--;
    following line 7, insert --215,128    08/1993    Japan--;

Under "ABSTRACT":
    line 9, after "rotates", replace "on a CCW side" by --in a counter-clockwise direction--.

Col. 2, line 32: after "the" (second occurrence), replace "first", by --second--;
    line 33: after "the" (first occurrence), replace "first", by --second--;
    line 35: after "the" (second occurrence), replace "second", by --first--;
    line 36: after "the" (second occurrence), replace "second", by --first--;

Col. 3, line 64: after "first", replace "maximal", by --minimal--;
    line 65: after "second", replace "maximal", by --minimal--; after "the", replace "grooves", by --groove forming region--;

Col. 4, line 48: after "point" (first occurrence), replace "$E_1$" by --$E_2$--, after "point", (second occurrence), replace "$E_2$", by --$E_1$--;

UNITED STATES PATENT AND TRADEMARK OFFICE
CERTIFICATE OF CORRECTION

Page 3 of 5

PATENT NO. : 5,944,427
DATED : Aug. 31, 1999
INVENTOR(S) : Murabe et al.

It is certified that error appears in the above-identified patent and that said Letters Patent is hereby corrected as shown below:

Col. 5, line 23: after "the" (second occurrence), replace "first", by --second--;
line 25: after "the" (second occurrence), replace "second", by --first--;
line 29: after "the" (second occurrence), replace "first", by --second--;
line 30: after "the" (second occurrence), replace "first", by --second--;
line 32: after "the" (second occurrence), replace "second", by --first--;
line 33: after "the" (second occurrence), replace "second", by --first--;

Col. 9, line 67: after "point", replace "$E_1$", by --$E_2$--;

Col. 10, line 2: after "point", replace "$E_2$", by --$E_1$--.

Col. 21, line 61, after "said", replace "first" by --second--;
line 63, before "maximal", replace "first" by --second--;
line 65, before "maximal", replace "second" by --first--;
line 66, before "maximal", replace "second" by --first--.

Col. 22, line 9, before "maximal", replace "third" by --fourth--;
line 10, before "maximal", replace "first" by --fourth--;
line 12, before "maximal", replace "fourth" by --third--;
line 14, before "maximal", replace "fourth" by --third--;
line 27, after "body", insert --and said bearing body--;

UNITED STATES PATENT AND TRADEMARK OFFICE
CERTIFICATE OF CORRECTION

Page 4 of 5

PATENT NO. : 5,944,427
DATED : Aug. 31, 1999
INVENTOR(S) : Murabe et al.

It is certified that error appears in the above-identified patent and that said Letters Patent is hereby corrected as shown below:

Col. 22, line 45, before "said" (first occurrence), replace "holding" by --arranged with--, after "point", delete "being";
         line 46, after "groove" insert --therebetween--;
         line 49, before "point", replace "maximal", by --minimal--;
         line 52, after "arranged", replace "in" by --on--;
         line 53, before "maximal", delete "second"; before "minimal", replace "first" by --second--;
         line 54, before "minimal", replace "first" by --second--;
         line 60, before "point", replace "maximal" by --minimal--;
         line 61, before "point", replace "maximal" by --minimal--; after "groove" insert --forming region--;

Col. 23, line 30, after "point", replace "$E_1$" by --$E_2$--;
         line 31, after "point", replace "$E_2$" by --$E_1$--;
         line 47, after "from", delete "said" (first occurrence); after "point", replace "$E_2$" by --$E_1$--;
         line 48, after "point", replace "$E_2$" by --$E_1$--;

UNITED STATES PATENT AND TRADEMARK OFFICE
CERTIFICATE OF CORRECTION

PATENT NO. : 5,944,427

DATED : Aug. 31, 1999

INVENTOR(S) : Murabe et al.

It is certified that error appears in the above-identified patent and that said Letters Patent is hereby corrected as shown below:

Col. 24, line 10, after "between", replace "two said" by --said two--;
        line 12, before "virtual", replace "two said" by --said two--;
        line 18, before "rotates", replace "shaft body" by --hollow cylindrical bearing body--;
        line 20, before "maximal", replace "first" by --second--;
        line 22, before "maximal", replace "second" by --first--;
        line 28, before "maximal", replace "first" by --second--;
        line 29, before "maximal", replace "first" by --second--;
        line 31, before "maximal", replace "second" by --first--;
        line 32, before "maximal", replace "second" by --first--

Signed and Sealed this

Eleventh Day of July, 2000

Attest:

Attesting Officer

Q. TODD DICKINSON

Director of Patents and Trademarks